United States Patent
Noh et al.

(10) Patent No.: US 11,589,390 B2
(45) Date of Patent: *Feb. 21, 2023

(54) MULTI-CARRIER SIGNAL TRANSMISSION METHOD, DEVICE, AND SYSTEM

(71) Applicant: WILUS INSTITUTE OF STANDARDS AND TECHNOLOGY INC., Gyeonggi-do (KR)

(72) Inventors: Minseok Noh, Seoul (KR); Jinsam Kwak, Gyeonggi-do (KR); Juhyung Son, Gyeonggi-do (KR); Geonjung Ko, Seoul (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/238,199

(22) Filed: Apr. 22, 2021

(65) Prior Publication Data

US 2021/0315015 A1 Oct. 7, 2021

Related U.S. Application Data

(63) Continuation of application No. 15/749,097, filed as application No. PCT/KR2016/008467 on Aug. 1, 2016, now Pat. No. 11,019,663.

(30) Foreign Application Priority Data

Jul. 31, 2015 (KR) .......... 10-2015-0108494
Aug. 10, 2015 (KR) .......... 10-2015-0112736
(Continued)

(51) Int. Cl.
*H04W 74/08* (2009.01)
*H04L 27/26* (2006.01)
(Continued)

(52) U.S. Cl.
CPC ......... *H04W 74/0825* (2013.01); *H04L 5/001* (2013.01); *H04L 5/0044* (2013.01);
(Continued)

(58) Field of Classification Search
CPC . H04L 27/2657; H04L 5/0098; H04L 5/0044; H04L 5/001; H04L 27/26; H04W 74/0825; H04W 84/12; H04W 74/0808
See application file for complete search history.

(56) References Cited

U.S. PATENT DOCUMENTS 11,019,663 B2 * 5/2021 Noh ................. H04W 74/0825
2004/0240426 A1 12/2004 Wu et al.
(Continued)

OTHER PUBLICATIONS

Office Action dated Nov. 12, 2021 for Korean Patent Application No. 10-2018-7005028 and its English translation provided by Applicant's foreign counsel.
(Continued)

*Primary Examiner* — Anez C Ebrahim
(74) *Attorney, Agent, or Firm* — Ladas & Parry, LLP

(57) ABSTRACT

Disclosed are a method, an apparatus, and a system for transmitting a signal using multiple carriers. In detail, provided are a wireless communication apparatus including a communication module; and a processor, wherein the processor obtains a common back-off counter for a carrier set on which data is to be transmitted, wherein the carrier set includes at least one component carrier, performs back-off of each of the component carriers using the obtained common back-off counter, and simultaneously transmits data through at least one component carrier in which the back-off is completed and a wireless communication method using the same.

18 Claims, 27 Drawing Sheets

(30) Foreign Application Priority Data

| Aug. 27, 2015 | (KR) | .......................... 10-2015-0121293 |
| Sep. 1, 2015 | (KR) | .......................... 10-2015-0123518 |
| Sep. 1, 2015 | (KR) | .......................... 10-2015-0123523 |
| Oct. 8, 2015 | (KR) | .......................... 10-2015-0141876 |

(51) Int. Cl.
  *H04L 5/00* (2006.01)
  *H04W 84/12* (2009.01)
  *H04J 11/00* (2006.01)
  *H04W 72/0453* (2023.01)

(52) U.S. Cl.
  CPC ............ *H04L 5/0098* (2013.01); *H04L 27/26* (2013.01); *H04L 27/2657* (2013.01); *H04W 74/0808* (2013.01); *H04W 84/12* (2013.01); *H04J 2011/0096* (2013.01); *H04W 72/0453* (2013.01); *H04W 74/0883* (2013.01)

(56) References Cited

U.S. PATENT DOCUMENTS

| 2006/0114823 | A1 | 6/2006 | Flemming et al. |
| 2010/0195664 | A1 | 8/2010 | Ho |
| 2011/0235511 | A1 | 9/2011 | Iyer et al. |
| 2013/0235770 | A1 | 9/2013 | Merlin et al. |
| 2014/0307602 | A1 | 10/2014 | Seok |
| 2014/0308965 | A1 | 10/2014 | Benveniste |
| 2018/0310340 | A1 | 10/2018 | Noh et al. |

OTHER PUBLICATIONS

Qualcomm Incorporated: "Multi-carrier LBT operation for LAA", 3GPP TSG RAN WG1 #81, R1-152784, May 25-29, 2015, Fukuoka, Japan, pp. 1-6.

International Search Report for PCT/KR2016/008467 dated Dec. 2, 2016 and its English translation from WIPO.

Written Opinion of the International Searching Authority for PCT/KR2016/008467 dated Dec. 2, 2016 and its English machine translation by Google Translate.

International Preliminary Report on Patentability (Chapter I) for PCT/KR2016/008467 dated Feb. 6, 2018 and its English translation from WIPO.

Notice of Allowance dated Jan. 22, 2021 for U.S. Appl. No. 15/749,097 (now published as 2018/0310340).

Final Office Action dated Sep. 22, 2020 for U.S. Appl. No. 15/749,097 (now published as 2018/0310340).

Office Action dated Mar. 27, 2020 for U.S. Appl. No. 15/749,097 (now published as 2018/0310340).

Office Action dated Mar. 15, 2022 for Korean Patent Application No. 10-2018-7005028 and its English translation provided by Applicant's foreign counsel.

Decision of Rejection for Amendment dated Mar. 15, 2022 for Korean Patent Application No. 10-2018-7005028 and its English translation provided by Applicant's foreign counsel.

Ericsson: "Discussion on framework and parameter setting for Category 4 LBT for LAA", 3GPP TSG RAN WG1 #82, R1-154620, Beijing, China, Aug. 24-28, 2015, pp. 1-6.

Office Action dated Jul. 2, 2021 for Korean Patent Application No. 10-2018-7005028.

Havish Koorapaty et al., "LS on RAN1 agreements on LAA", 3GPP TSG RAN WG1 Meeting #83 Anaheim, USA, Nov. 15-22, 2015, R1-157905, published on Nov. 25, 2015.

Samsung et al., "WF on Self-deferral for LBT Cat.4", 3GPP TSG RAN WG1 #82 Beijing, China Aug. 24-28, 2015, R1-154777, published on Aug. 30, 2015.

Ericsson et al., "List of agreements on LAA from RAN1#83", 3GPP TSG-RAN WG1 Contribution, R1-157622, published on Nov. 25, 2015.

Office Action dated May 13, 2022 for Korean Patent Application No. 10-2018-7005028 and its English translation provided by Applicant's foreign counsel.

Decision of Rejection for Amendment dated May 13, 2022 for Korean Patent Application No. 10-2018-7005028 and its English translation provided by Applicant's foreign counsel.

\* cited by examiner

FIG. 6
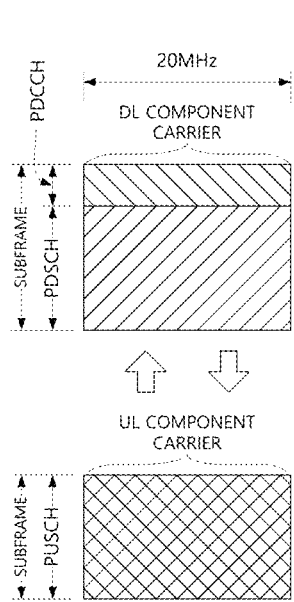
(a) Single CC
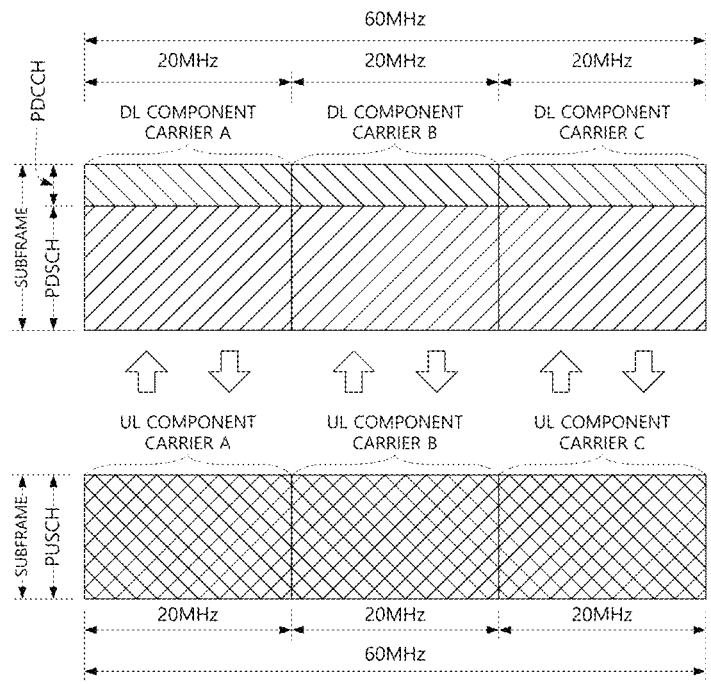
(b) Multiple CC

FIG. 24
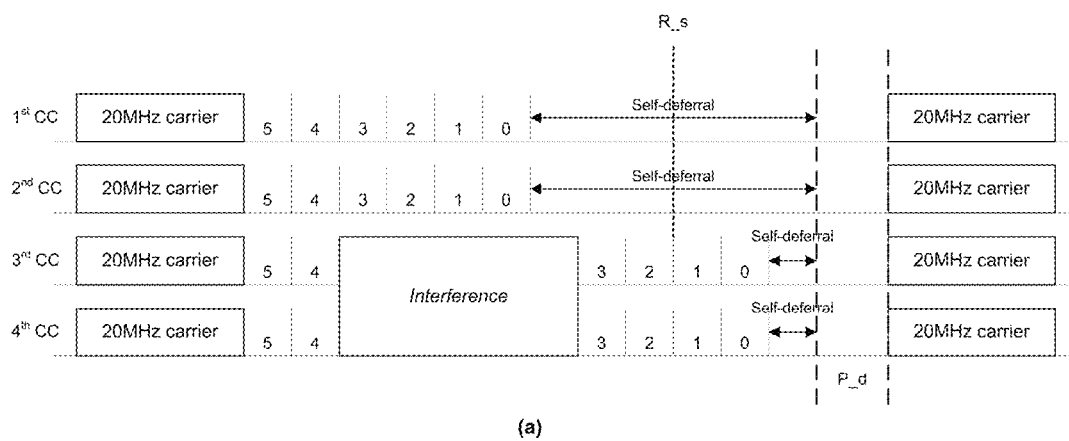
(a)
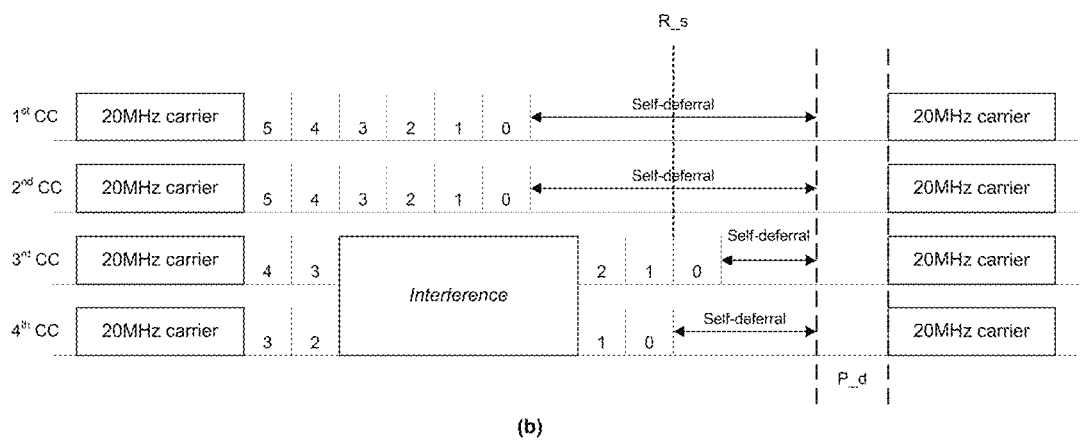
(b)

FIG. 25
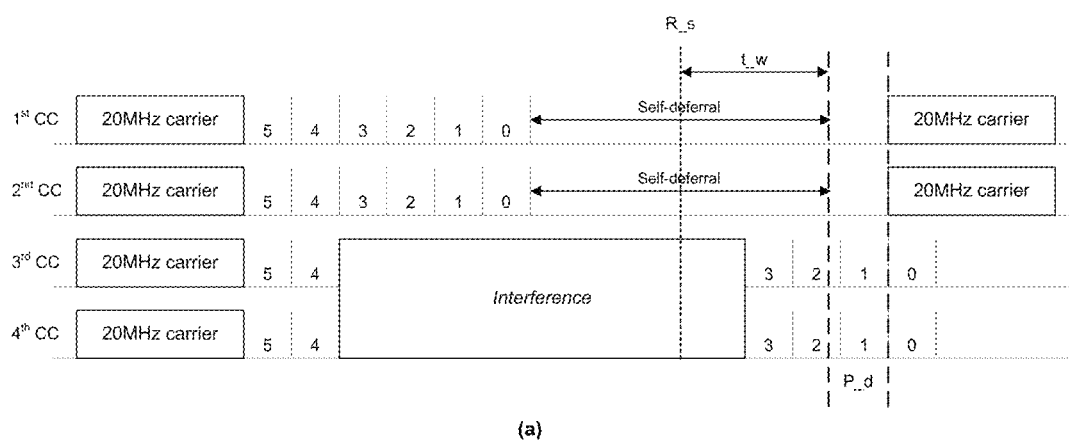
(a)
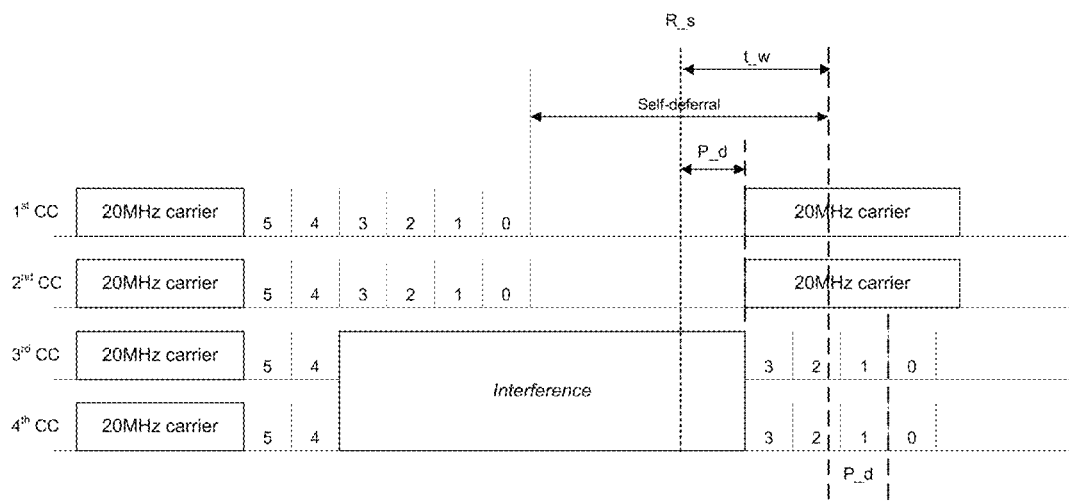
(b)

FIG. 26
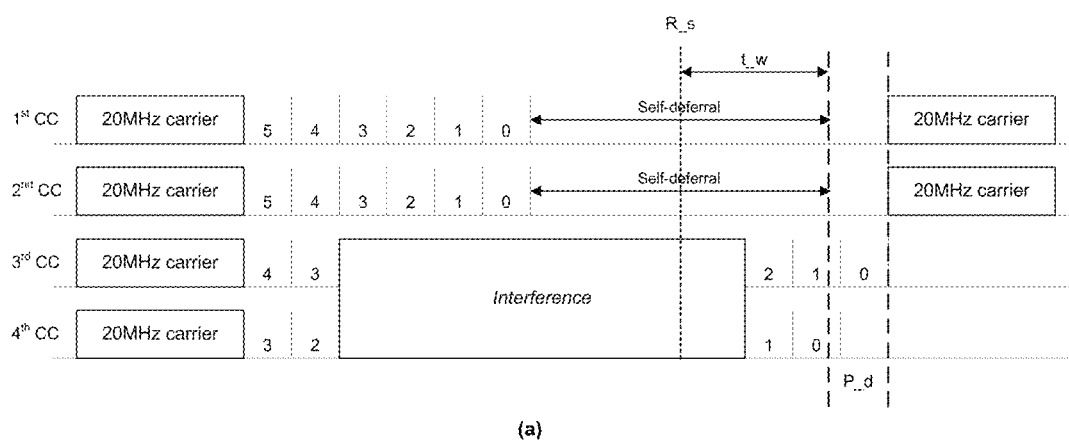
(a)
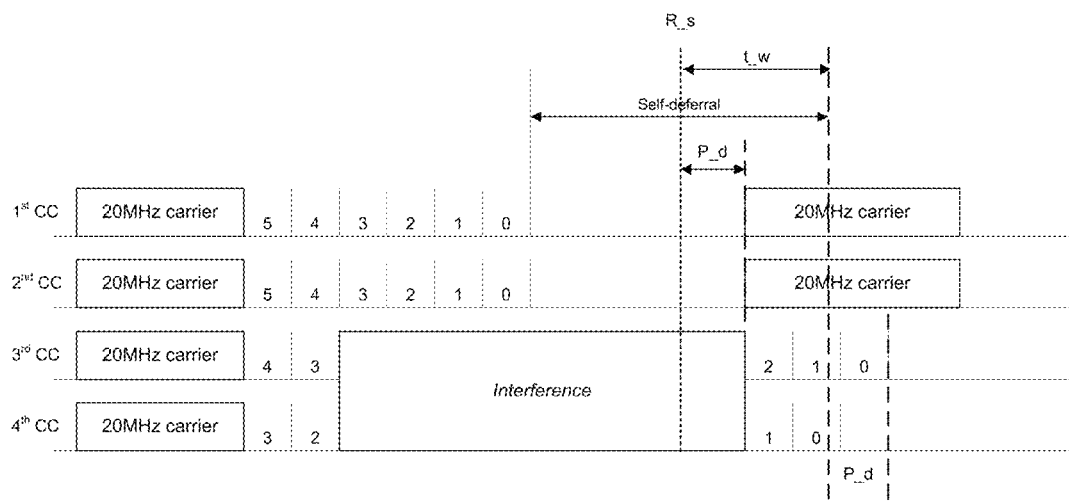
(b)

MULTI-CARRIER SIGNAL TRANSMISSION METHOD, DEVICE, AND SYSTEM

CROSS-REFERENCE TO RELATED APPLICATIONS

This application is a continuation of U.S. patent application Ser. No. 15/749,097 filed on Jul. 2, 2018, which is the U.S. National Stage of International Patent Application No. PCT/KR2016/008467 filed on Aug. 1, 2016, which claims the priority to Korean Patent Application No. 10-2015-0108494 filed in the Korean Intellectual Property Office on Jul. 31, 2015, Korean Patent Application No. 10-2015-0112736 filed in the Korean Intellectual Property Office on Aug. 10, 2015, Korean Patent Application No. 10-2015-0121293 filed in the Korean Intellectual Property Office on Aug. 27, 2015, Korean Patent Application No. 10-2015-0123518 filed in the Korean Intellectual Property Office on Sep. 1, 2015, Korean Patent Application No. 10-2015-0123523 filed in the Korean Intellectual Property Office on Sep. 1, 2015, and Korean Patent Application No. 10-2015-0141876 filed in the Korean Intellectual Property Office on Oct. 8, 2015, the entire contents of which are incorporated herein by reference.

TECHNICAL FIELD

The present invention relates to a wireless communication system. Particularly, the present invention relates to a method, an apparatus, and a system for transmitting a signal using multiple carriers.

BACKGROUND ART

In recent years, with an explosive increase of mobile traffic due to the spread of smart devices, it has been difficult to cope with data usage which increases for providing a cellular communication service only by a conventional licensed frequency spectrum or LTE-licensed frequency band.

In such a situation, a scheme that uses an unlicensed frequency spectrum or LTE-Unlicensed frequency band (e.g., 2.4 GHz band, 5 GHz band, or the like) for providing the cellular communication service has been devised as a solution for a spectrum shortage problem.

However, unlike the licensed band in which a communication service provider secures an exclusive frequency use right through a procedure such as auction, or the like, in the unlicensed band, multiple communication facilities can be used simultaneously without limit when only a predetermined level of adjacent band protection regulation is observed. As a result, when the unlicensed band is used in the cellular communication service, it is difficult to guarantee communication quality at a level provided in the licensed band and an interference problem with a conventional wireless communication device (e.g., wireless LAN device) using the unlicensed band may occur.

Therefore, a research into a coexistence scheme with the conventional unlicensed band device and a scheme for efficiently sharing a radio channel needs to be preferentially made in order to settle an LTE technology in the unlicensed band. That is, a robust coexistence mechanism (RCM) needs to be developed in order to prevent a device using the LTE technology in the unlicensed band from influencing the conventional unlicensed band device.

DISCLOSURE

Technical Problem

The present invention has been made in an effort to provide a method for efficiently transmitting a signal in a wireless communication system, in particular, a cellular wireless communication system and an apparatus therefor. Further, the present invention has been made in an effort to provide a method for efficiently transmitting a signal in a specific frequency band (e.g., unlicensed band) and an apparatus therefor.

Technical objects desired to be achieved in the present invention are not limited to the aforementioned objects, and other technical objects not described above will be apparently understood by those skilled in the art from the following disclosure.

Technical Solution

According to the exemplary embodiment of the present invention, the following wireless communication apparatus and wireless communication method are provided.

First, an exemplary embodiment of the present invention provides a wireless communication apparatus, including: a communication module; and a processor, wherein the processor obtains a common back-off counter for a carrier set on which data is to be transmitted, wherein the carrier set includes at least one component carrier, performs back-off of each of the component carriers using the obtained common back-off counter, and simultaneously transmits data through at least one component carrier in which the back-off is completed.

In addition, an exemplary embodiment of the present invention provides a data communication method using multiple carriers, the method including: obtaining a common back-off counter for a carrier set on which data is to be transmitted, wherein the carrier set includes at least one component carrier; performing back-off of each of the component carriers using the obtained common back-off counter; and simultaneously transmitting data through at least one component carrier in which the back-off is completed.

A self-deferral that does not arbitrarily decrease a back-off counter while performing back-off of the at least one component carrier may be performed.

The self-deferral may be performed when a remaining back-off counter value of a corresponding component carrier is greater than zero.

An additional CCA of a first component carrier in which the back-off is completed may be performed during a predetermined defer period, and data may be transmitted through the first component carrier when the first component carrier is idle during the defer period.

Data may be transmitted after the additional CCA during the defer period when data is not transmitted through the first component carrier in the simultaneous transmission of the data.

The defer period may be composed of at least one slot.

A contention window value may be set independently for each component carrier of the carrier set, a back-off counter may be obtained within a largest contention window value among contention window values of all component carriers of the carrier set, and the back-off counter obtained within the largest contention window value may be used as the common back-off counter.

A single contention window value may be set for all component carriers of the carrier set, and a back-off counter obtained within the single contention window may be used as the common back-off counter.

An energy detection threshold for the back-off may be determined based on at least one of a total bandwidth and a total transmission power of data to be simultaneously transmitted.

The energy detection threshold value may be set to be higher as the total transmission power value with respect to the total bandwidth is lower.

Advantageous Effects

According to exemplary embodiments of the present invention, provided are a method for efficiently transmitting a signal in a wireless communication system, in particular, a cellular wireless communication system and an apparatus therefor. Further, provided are a method for efficiently transmitting a signal in a specific frequency band (e.g., unlicensed band) and an apparatus therefor.

According to exemplary embodiments of the present invention, data transmission through multi-carrier transmission can be performed. In this case, the base station can efficiently use the time and frequency resources according to the multi-carrier transmission and reduce the data transmission delay.

Effects to be acquired in the present invention are not limited to the aforementioned effects, and other effects not described above will be apparently understood by those skilled in the art from the following disclosure.

DESCRIPTION OF DRAWINGS

FIG. 6 is a diagram for describing single carrier communication and multi-carrier communication.

FIGS. 24 to 26 illustrate further embodiments of the present invention in which a base station determines whether to continue a self-deferral.

DETAILED DESCRIPTION OF THE INVENTION

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "equal to or more than" or "equal to or less than" based on a specific threshold may be appropriately substituted with "more than" or "less than", respectively in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-TDMA (SC-FDMA), and the like. The CDMA may be implemented by a radio technology such as universal terrestrial radio access (UTRA) or CDMA2000. The TDMA may be implemented by a radio technology such as global system for mobile communications (GSM)/general packet radio service (GPRS)/enhanced data rates for GSM evolution (EDGE). The OFDMA may be implemented by a radio technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). $3^{rd}$ generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP LTE/LTE-A is primarily described for clear description, but technical spirit of the present invention is not limited thereto.

Figure 1:
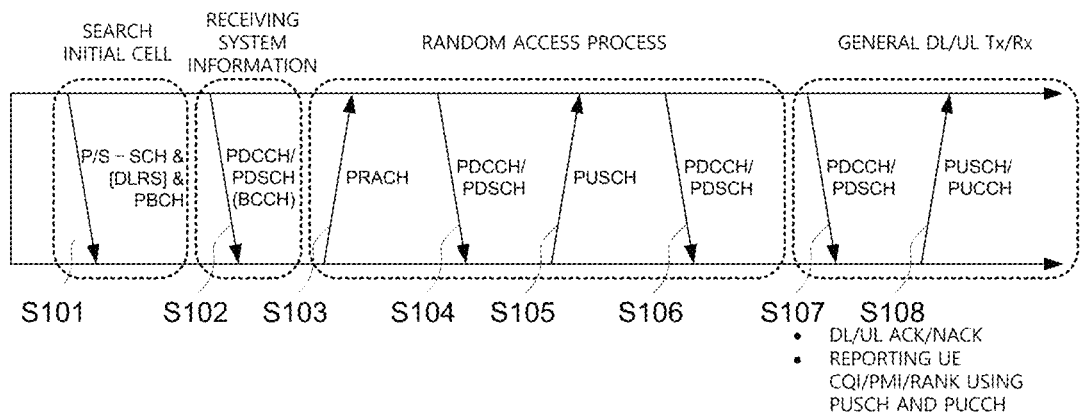
FIG. 1 illustrates physical channels used in a 3rd generation partnership project (3GPP) system and a general signal transmitting method using the physical channels.

FIG. 1 illustrates physical channels used in a 3GPP system and a general signal transmitting method using the physical channels. A user equipment receives information from a base station through downlink (DL) and the user equipment transmits information through uplink (UL) to the base station. The information transmitted/received between the base station and the user equipment includes data and various control information and various physical channels exist according to a type/purpose of the information transmitted/received between the base station and the user equipment.

When a power of the user equipment is turned on or the user equipment newly enters a cell, the user equipment performs an initial cell search operation including synchronization with the base station, and the like (S101). To this end, the user equipment receives a primary synchronization channel (P-SCH) and a secondary synchronization channel (S-SCH) from the base station to synchronize with the base station and obtain information including a cell ID, and the like. Thereafter, the user equipment receives a physical broadcast channel from the base station to obtain intra-cell broadcast information. The user equipment receives a downlink reference signal (DL RS) in an initial cell search step to verify a downlink channel state.

The user equipment that completes initial cell search receives a physical downlink control channel (PDCCH) and a physical downlink shared channel (PDSCH) depending on information loaded on the PDCCH to obtain more detailed system information (S102).

When there is no radio resource for initially accessing the base station or signal transmission, the user equipment may perform a random access procedure (RACH procedure) to the base station (S103 to S106). First, the user equipment may transmit a preamble through a physical random access channel (PRACH) (S103) and receive a response message to the preamble through the PDCCH and the PDSCH corresponding thereto (S104). When a random access response message effective to the user equipment is received, the user equipment transmits data including its identifier, and the like to the base station using an UL grant (S105). Next, the user equipment waits for reception of a PDCCH as an indication of the base station to resolve a conflict. When the user equipment receives the PDCCH through its identifier (S106), the random access procedure is terminated.

Thereafter, the user equipment may receive the PDCCH/PDSCH (S107) and transmit a physical uplink shared channel (PUSCH)/physical uplink control channel (PUCCH) (S108) as a general procedure. The user equipment receives downlink control information (DCI) through the PDCCH. The DCI includes control information such as resource allocation information to the user equipment and a format varies depending on a use purpose. The control information which the user equipment transmits to the base station is designated as uplink control information (UCI). The UCI includes an acknowledgement/negative acknowledgement (ACK/NACK), a channel quality indicator (CQI), a precoding matrix index (PMI), a rank indicator (RI), and the like. The UCI may be transmitted through the PUSCH and/or PUCCH.

Figure 2:
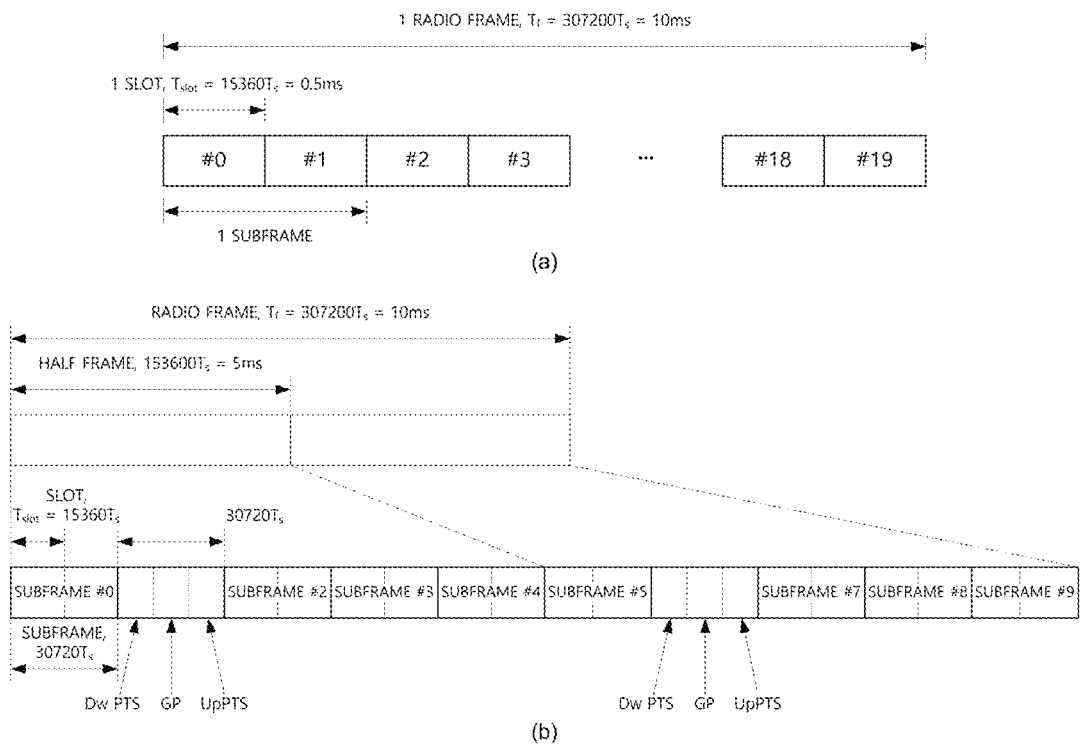
FIG. 2 illustrates one example of a radio frame structure used in a wireless communication system.

FIG. 2 illustrates one example of a radio frame structure used in a wireless communication system. FIG. 2(a) illustrates a frame structure for frequency division duplex (FDD) and FIG. 2(b) illustrates a frame structure for time division duplex (TDD).

Referring to FIG. 2, a radio frame may have a length of 10 ms (307200 Ts) and be constituted by 10 subframes (SFs). Ts represents a sampling time and is expressed as Ts=1/(2048*15 kHz). Each subframe may have a length of 1 ms and be constituted by 2 slots. Each slot has a length of 0.5 ms. In one radio frame, 20 slots may be sequentially numbered from 0 to 19. Each slot has a length of 0.5 ms. A time for transmitting one subframe is defined as a transmission time interval (TTI). A time resource may be distinguished by radio frame numbers/indexes, subframe numbers/indexes #0 to #9, and slot numbers/indexes #0 to #19.

The radio frame may be configured differently according to a duplex mode. In an FDD mode, downlink transmission and uplink transmission are distinguished by a frequency and the radio frame includes only one of a downlink subframe and an uplink subframe with respect to a specific frequency band. In a TDD mode, the downlink transmission and the uplink transmission are distinguished by a time and the radio frame includes both the downlink subframe and the uplink subframe with respect to a specific frequency band. The TDD radio frame further includes a special subframe for switching between downlink and uplink. The special subframe is configured with a downlink pilot time slot (DwPTS), a guard period (GP), and an uplink pilot times slot (UpPTS).

Figure 3:
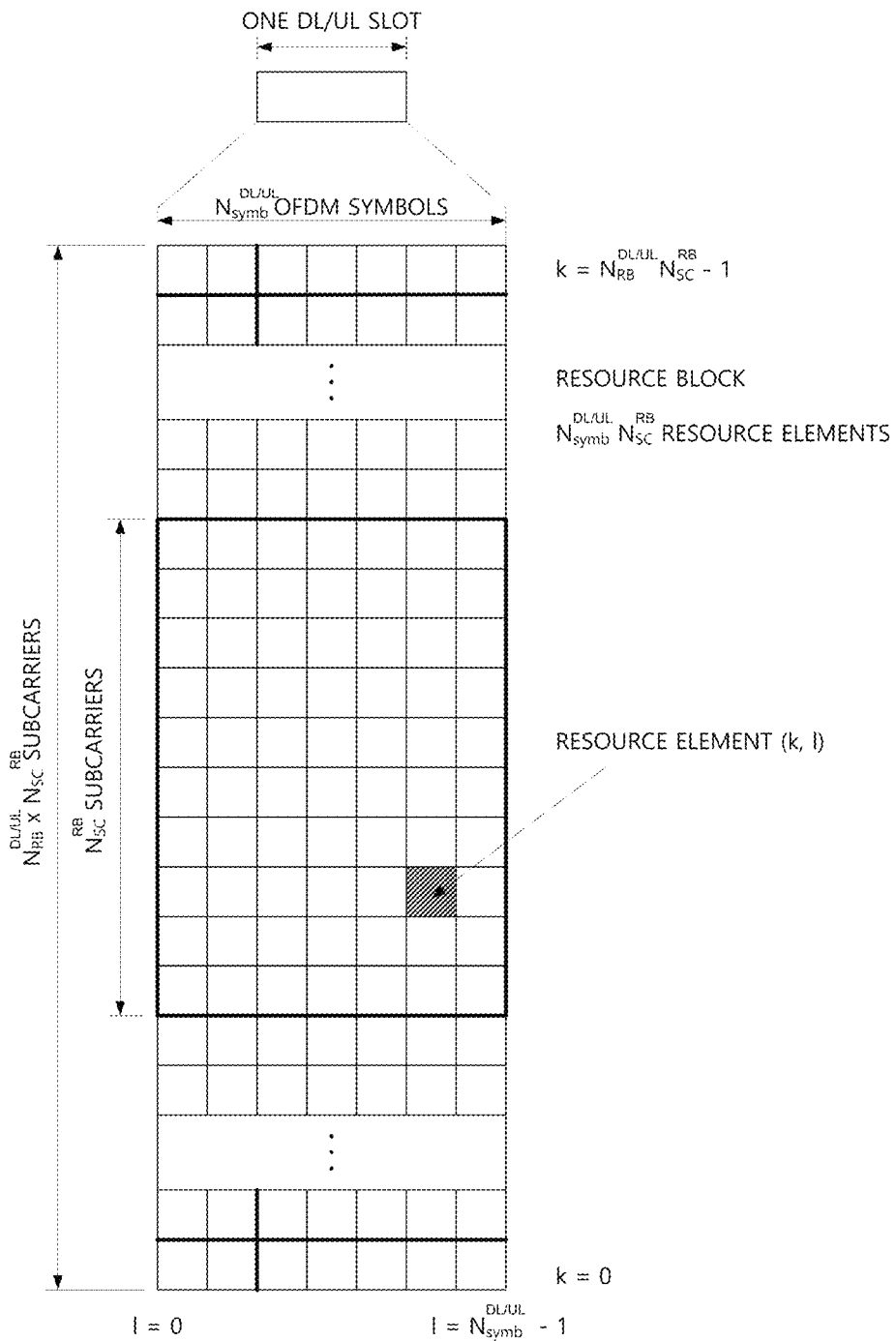
FIG. 3 illustrates one example of a downlink (DL)/uplink (UL) slot structure in the wireless communication system.

FIG. 3 illustrates a structure of a downlink/uplink slot.

Referring to FIG. 3, the slot includes a plurality of orthogonal frequency divisional multiplexing (OFDM) symbols in a time domain and a plurality of resource blocks (RBs) in a frequency domain. The OFDM symbol also means one symbol period. The OFDM symbol may be called an OFDMA symbol, a single carrier frequency division multiple access (SC-FDMA) symbol, or the like according to a multi-access scheme. The number of OFDM symbols included in one slot may be variously modified according to the length of a cyclic prefix (CP). For example, in the case of a normal CP, one slot includes 7 OFDM symbols and in the case of an extended CP, one slot includes 6 OFDM symbols. The RB is defined as $N^{DL/UL}_{symb}$ (e.g., 7) continuous OFDM symbols in the time domain and $N^{RB}_{sc}$ (e.g., 12) continuous subcarriers in the frequency domain. A resource constituted by one OFDM symbol and one subcarrier is referred to as a resource element (RE) or a tone. One RB is constituted by $N^{DL/U}_{symb} * N^{RB}_{sc}$ resource elements.

The resource of the slot may be expressed as a resource grid constituted by $N^{DL/UL}_{RB} * N^{RB}_{sc}$ subcarriers and $N^{DL/UL}_{symb}$ OFDM symbols. Each RE in the resource grid is uniquely defined by an index pair (k, l) for each slot. k represents an index given with 0 to $N^{DL/UL}_{RB} * N^{RB}_{sc} - 1$ in the frequency domain and l represents an index given with 0 to $N^{DL/UL}_{symb} - 1$ in the time domain. Herein, $N^{DL}_{RB}$ represents the number of resource blocks (RBs) in the downlink slot and $N^{UL}_{RB}$ represents the number of RBs in the UL slot. $N^{DL}_{RB}$ and $N^{UL}_{RB}$ depend on a DL transmission bandwidth and a UL transmission bandwidth, respectively. $N^{DL}_{symb}$ represents the number of symbols in the downlink slot and $N^{UL}_{symb}$ represents the number of symbols in the UL slot. $N^{RB}_{sc}$ represents the number of subcarriers constituting one RB. One resource grid is provided per antenna port.

Figure 4:
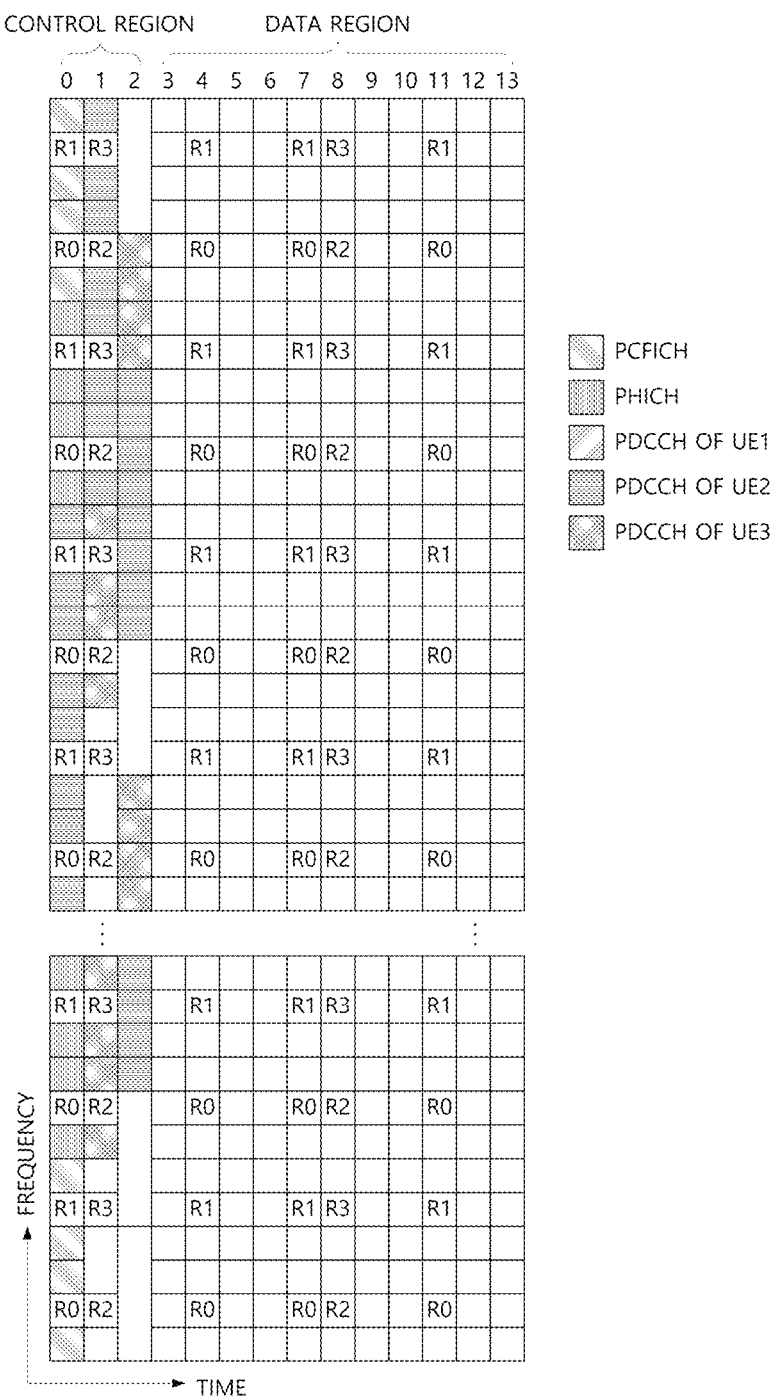
FIG. 4 illustrates a structure of a downlink subframe.

FIG. 4 illustrates a structure of a downlink subframe.

Referring to FIG. 4, the subframe may be constituted by 14 OFDM symbols. First 1 to 3 (alternatively, 2 to 4) OFDM symbols are used as a control region and the remaining 13 to 11 (alternatively, 12 to 10) OFDM symbols are used as a data region according to subframe setting. R1 to R4 represent reference signals for antenna ports 0 to 3. Control channels allocated to the control region include a physical control format indicator channel (PCFICH), a physical hybrid-ARQ indicator channel (PHICH), a physical downlink control channel (PDCCH), and the like. Data channels allocated to the data region include the PDSCH, and the like. When an enhanced PDCCH (EPDCCH) is set, the PDSCH and the EPDCCH are multiplexed by frequency division multiplexing (FDM) in the data region.

The PDCCH as the physical downlink control channel is allocated to first n OFDM symbols of the subframe. n as an integer of 1(alternatively, 2) or more is indicated by the PCFICH. The PDCCH announces information associated with resource allocation of a paging channel (PCH) and a downlink-shared channel (DL-SCH) as transmission channels, an uplink scheduling grant, HARQ information, and the like to each user equipment or user equipment group. Data (that is, transport block) of the PCH and the DL-SCH are transmitted through the PDSCH. Each of the base station and the user equipment generally transmit and receive data through the PDSCH except for specific control information or specific service data.

Information indicating to which user equipment (one or a plurality of user equipments) the data of the PDSCH is transmitted, information indicating how the user equipments receive and decode the PDSCH data, and the like are transmitted while being included in the PDCCH/EPDCCH. For example, it is assumed that the PDCCH/EPDCCH is CRC-masked with a radio network temporary identity (RNTI) called "A" and information regarding data transmitted by using a radio resource (e.g., frequency location) called "B" and a DCI format called "C", that is, transmission format information (e.g., transport block size, modulation scheme, coding information, and the like) is transmitted through a specific subframe. In this case, a user equipment in the cell monitors the PDCCH/EPDCCH by using the RNTI information thereof and when one or more user equipments having the "A" RNTI are provided, the user equipments receive the PDCCH/EPDCCH and receive the PDSCH indicated by "B" and "C" through information on the received PDCCH/EPDCCH.

Figure 5:
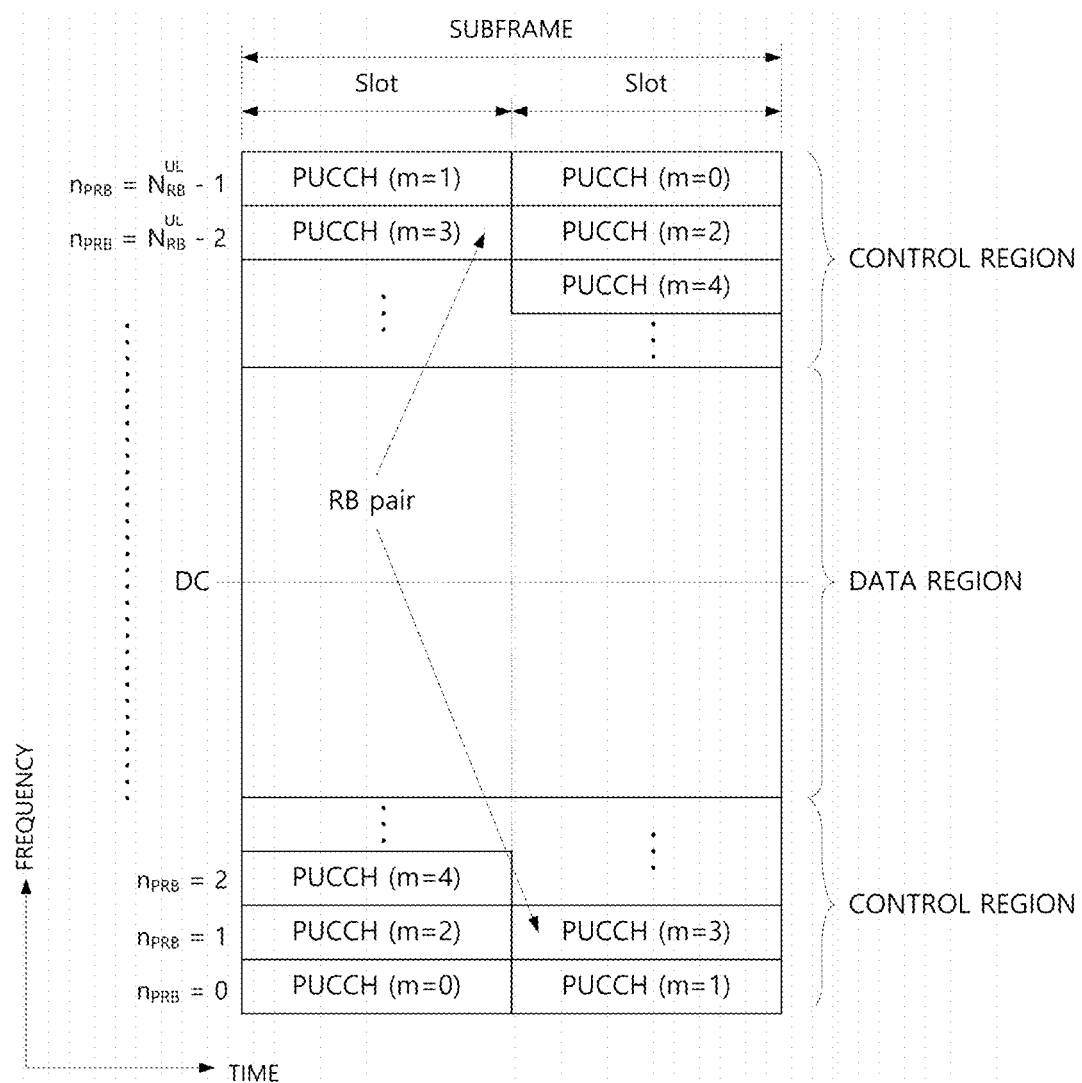
FIG. 5 illustrates a structure of an uplink subframe.

FIG. 5 illustrates a structure of an uplink subframe.

Referring to FIG. 5, the subframe may be divided into the control region and the data region in the frequency domain. The PUCCH is allocated to the control region and carries the UCI. The PUSCH is allocated to the data region and carries user data.

The PUCCH may be used to transmit the following control information.

Scheduling Request (SR): Information used to request a UL-SCH resource.
The SR is transmitted by using an on-off keying (OOK) scheme.
HARQ-ACK: Response to the PDCCH and/or response to a downlink data packet (e.g., codeword) on the PDSCH. The codeword is an encoded format of the transport block. The HARQ-ACK indicates whether the PDCCH or PDSCH is successfully received. The HARQ-ACK response includes a positive ACK (simply, ACK), a negative ACK (NACK), discontinuous transmission (DTX), or the NACK/DTX. The DTX represents a case in which the user equipment misses the PDCCH (alternatively, semi-persistent scheduling (SPS) PDSCH) and the NACK/DTX means the NACK or DTX. The HARQ-ACK is mixedly used with the HARQ-ACK/NACK and the ACK/NACK.
Channel State Information (CSI): Feed-back information regarding the downlink channel. Multiple input multiple output (MIMO) related feed-back information includes the RI and the PMI.

Table 1 shows the relationship between a PUCCH format and the UCI.

TABLE 1

| PUCCH Format | Uplink control information (UCI) |
|---|---|
| Format 1 | Scheduling request (SR) (non-modulated waveform) |
| Format 1a | 1-bit HARQ ACK/NACK (SR existence/non-existence) |
| Format 1b | 2-bit HARQ ACK/NACK (SR existence/non-existence) |
| Format 2 | CSI (20 coded bits) |
| Format 2 | CSI and 1 or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

Hereinafter, carrier aggregation will be described. The carrier aggregation means a method in which the wireless communication system uses a plurality of frequency blocks as one large logical frequency band in order to use a wider frequency band. When a whole system band is extended by the carrier aggregation, a frequency band used for communication with each user equipment is defined by a component carrier (CC) unit.

FIG. 6 is a diagram for describing single carrier communication and multi-carrier communication. FIG. 6(a) illustrates a subframe structure of a single carrier and FIG. 6(b) illustrates a subframe structure of multi-carriers which are carrier-aggregated.

Referring to FIG. 6(a), in a single carrier system, the base station and the user equipment perform data communication through one DL band and one UL band corresponding thereto. The DL/UL band is divided into a plurality of orthogonal subcarriers and each frequency band operates at one carrier frequency. In the FDD, the DL and UL bands operate at different carrier frequencies, respectively and in the TDD, the DL and UL bands operate at the same carrier frequency. The carrier frequency means a center frequency of the frequency band.

Referring to FIG. 6(b), the carrier aggregation is distinguished from an OFDM system that performs DL/UL communication in a base frequency band divided into a plurality of subcarriers by using one carrier frequency, in that the carrier aggregation performs DL/UL communication by using a plurality of carrier frequencies. Referring to FIG. 6(b), three 20 MHz CCs are gathered in each of the UL and the DL to support a bandwidth of 60 MHz. The CCs may be adjacent to each other or non-adjacent to each other in the frequency domain. For convenience, FIG. 6(b) illustrates a case in which a bandwidth of a UL CC and a bandwidth of a DL CC are the same as each other and symmetric to each other, but the bandwidths of the respective CCs may be independently decided. Further, asymmetric carrier aggregation in which the number of UL CCs and the number of DL CCs are different from each other is also available. The DL/UL CC(s) are independently allocated/configured for each user equipment and the DL/UL CC(s) allocated/configured to the user equipment are designated as serving UL/DL CC(s) of the corresponding user equipment.

The base station may activate some or all of serving CCs of the user equipment or deactivate some CCs. When the base station allocates the CC(s) to the user equipment, if the CC allocation to the user equipment is wholly reconfigured or if the user equipment does not hand over, at least one specific CC among the CC(s) configured with respect to the corresponding user equipment is not deactivated. A specific CC which is always activated is referred to as a primary CC (PCC) and a CC which the base station may arbitrarily activate/deactivate is referred to as a secondary CC (SCC). The PCC and the SCC may be distinguished based on the control information. For example, specific control information may be set to be transmitted/received only through a specific CC and the specific CC may be referred to as the PCC and remaining CC(s) may be referred to as SCC(s). The PUCCH is transmitted only on the PCC.

In 3GPP, a concept of the cell is used in order to manage the radio resource. The cell is defined as a combination of the DL resource and the UL resource, that is, a combination of the DL CC and the UL CC. The cell may be configured by the DL resource only or the combination of the DL resource and the UL resource. When the carrier aggregation is supported, a linkage between the carrier frequency of the DL resource (alternatively, DL CC) and the carrier frequency of the UL resource (alternatively, UL CC) may be indicated by system information. For example, the combination of the DL resource and the UL resource may be indicated by a system information block type 2 (SIB2) linkage. The carrier frequency means a center frequency of each cell or CC. A cell corresponding to the PCC is referred to as the primary cell (PCell) and a cell corresponding to the SCC is referred to as the secondary cell (SCell). A carrier corresponding to the PCell is a DL PCC in the downlink and a carrier corresponding to the PCell is a UL PCC in the uplink. Similarly, a carrier corresponding to the SCell is a DL SCC in the downlink and a carrier corresponding to the SCell is a UL SCC in the uplink. According to a user equipment capability, the serving cell(s) may be constituted by one PCell and 0 or more SCells. For a user equipment which is in an RRC_CONNECTED state, but does not have any configuration for the carrier aggregation or does not support the carrier aggregation, only one serving cell constituted by only the PCell is present.

Figure 7:
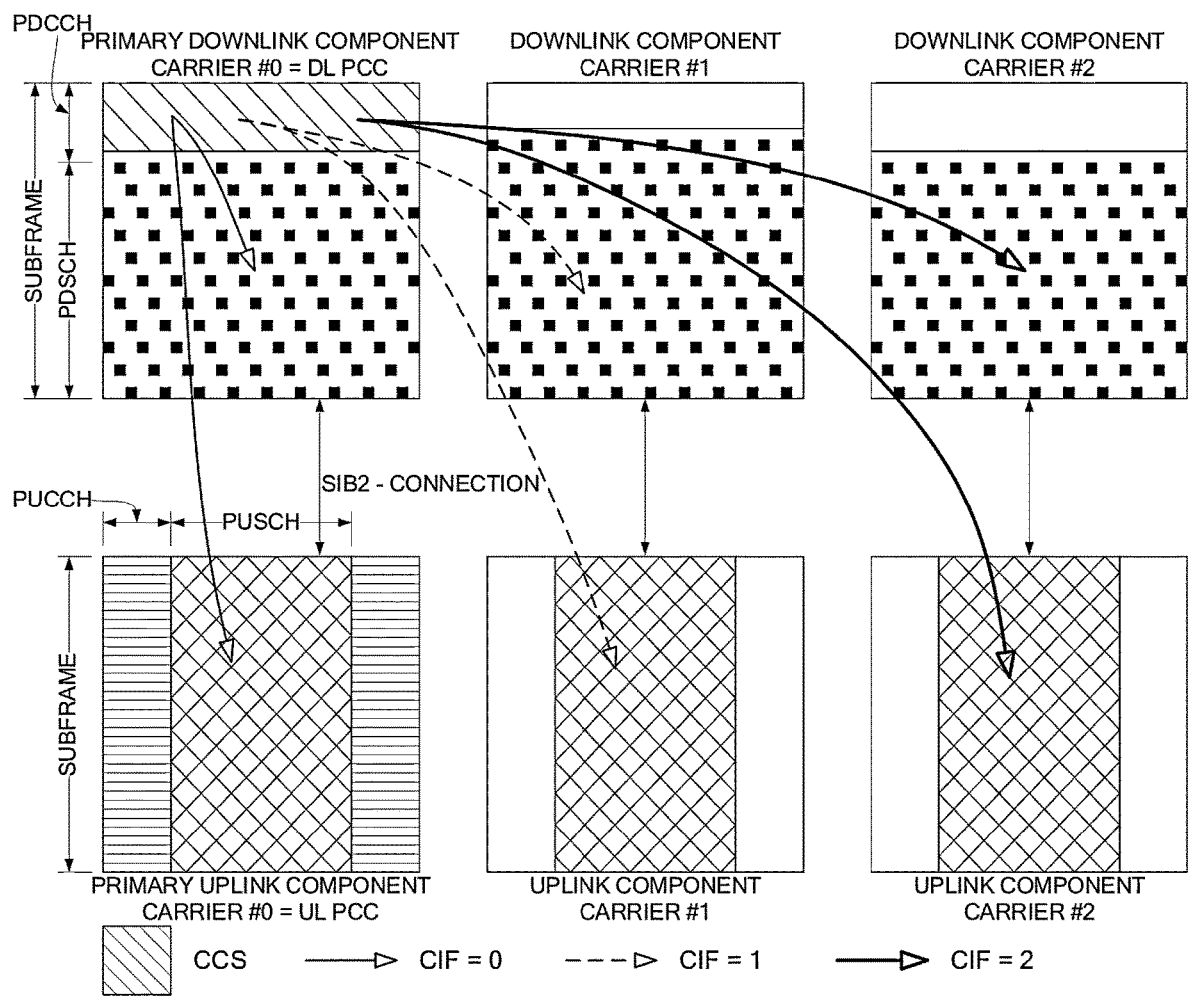
FIG. 7 illustrates an example in which a cross carrier scheduling technique is applied.

FIG. 7 illustrates an example in which cross carrier scheduling is applied. When the cross carrier scheduling is configured, a control channel transmitted through a first CC may schedule a data channel transmitted through the first CC or a second CC by using a carrier indicator field (CIF). The CIF is included in the DCI. In other words, a scheduling cell is configured, and a DL grant/UL grant transmitted in a PDCCH area of the scheduling cell schedules the PDSCH/PUSCH of a scheduled cell. That is, a search space for a plurality of component carriers is present in the PDCCH area of the scheduling cell. The PCell may be basically the scheduling cell and a specific SCell may be designated as the scheduling cell by a higher layer.

In FIG. 7, it is assumed that three DL CCs are aggregated. Herein, DL component carrier #0 is assumed as the DL PCC (alternatively, PCell) and DL component carrier #1 and DL component carrier #2 are assumed as the DL SCC (alternatively, SCell). Further, it is assumed that the DL PCC is set as a PDCCH monitoring CC. When the CIF is disabled, the respective DL CCs may transmit only the PDCCH that schedules the PDSCH thereof without the CIF according to an LTE PDCCH rule (non-cross carrier scheduling or self-carrier scheduling). On the contrary, when the CIF is enabled by UE-specific (alternatively, UE-group-specific or cell-specific) higher layer signaling, a specific CC (e.g., DL PCC) may transmit the PDCCH scheduling the PDSCH of DL CC A and the PDCCH scheduling the PDSCH of another CC by using the CIF (cross-carrier scheduling). On the contrary, in another DL CC, the PDCCH is not transmitted.

Figure 8:
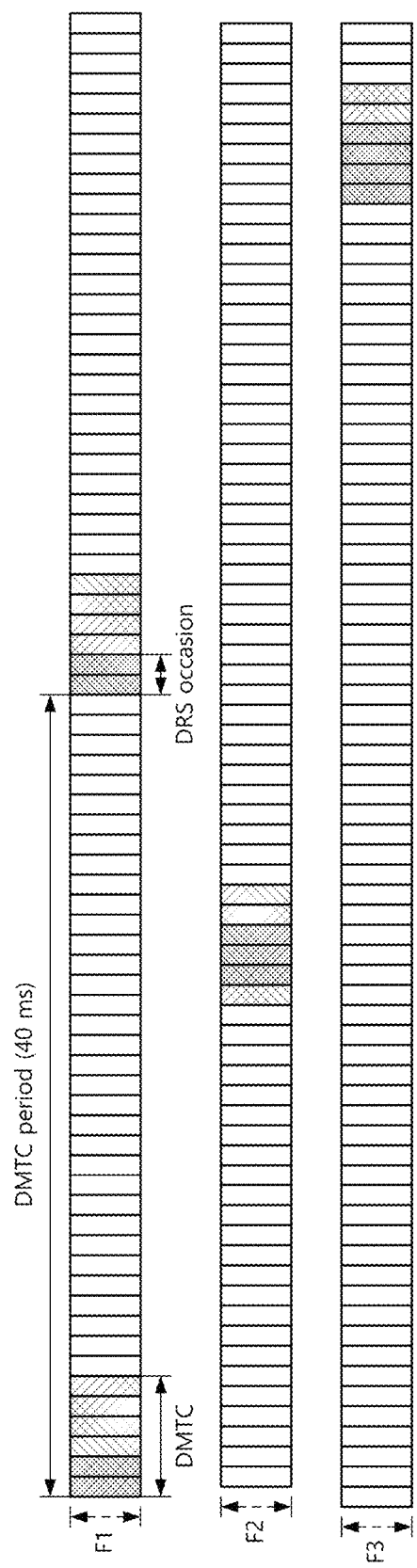
FIG. 8 illustrates a discovery reference signal (DRS) transmission.
Figure 9:
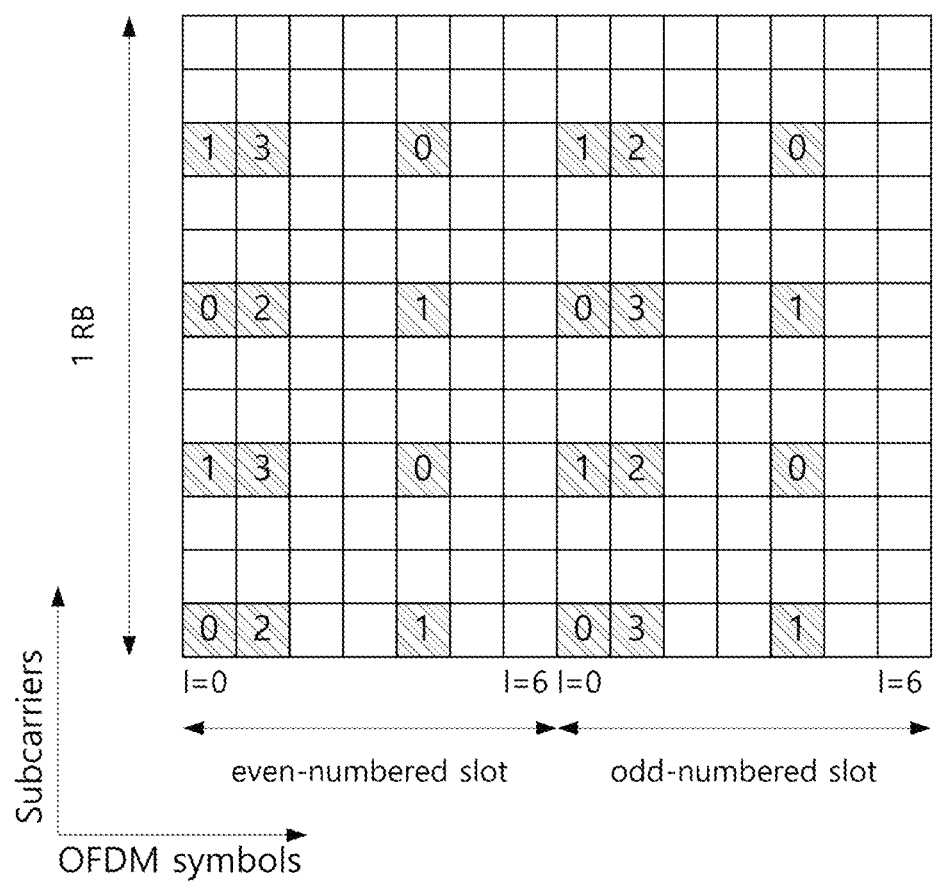
FIGS. 9 to 11 illustrate a structure of a reference signal used as a DRS.
Figure 10:
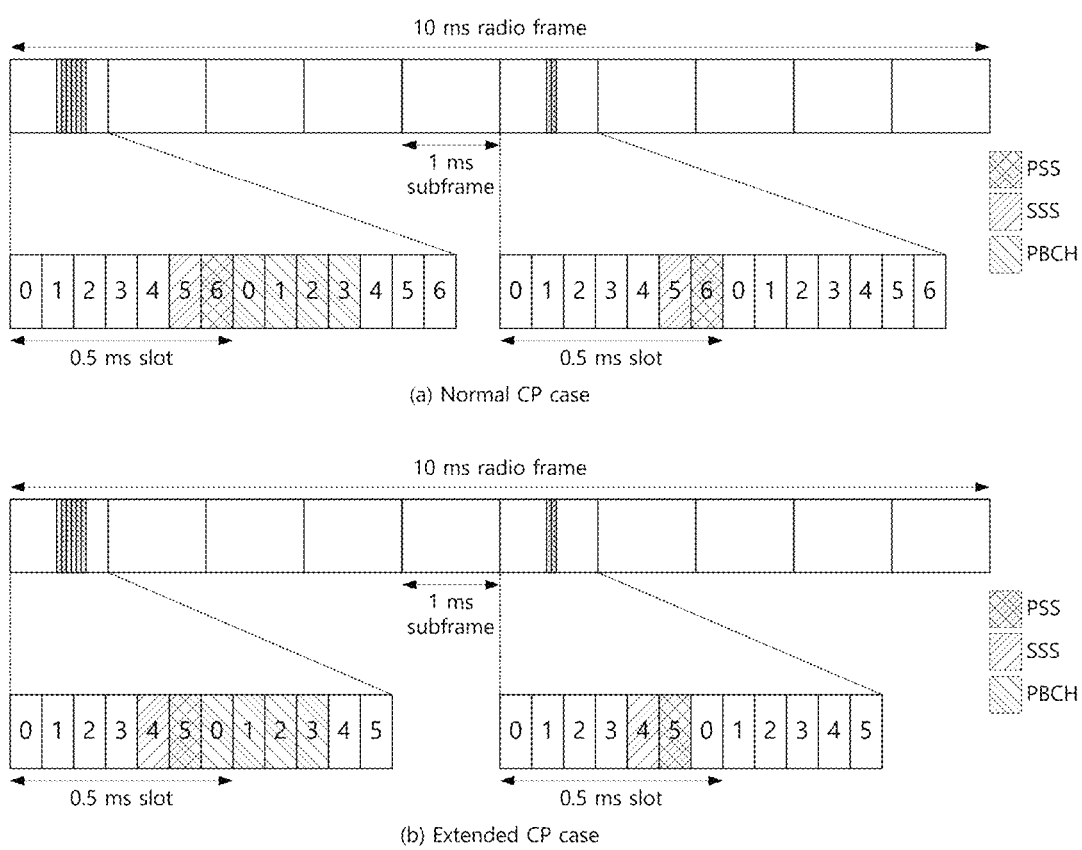
Figure 11:
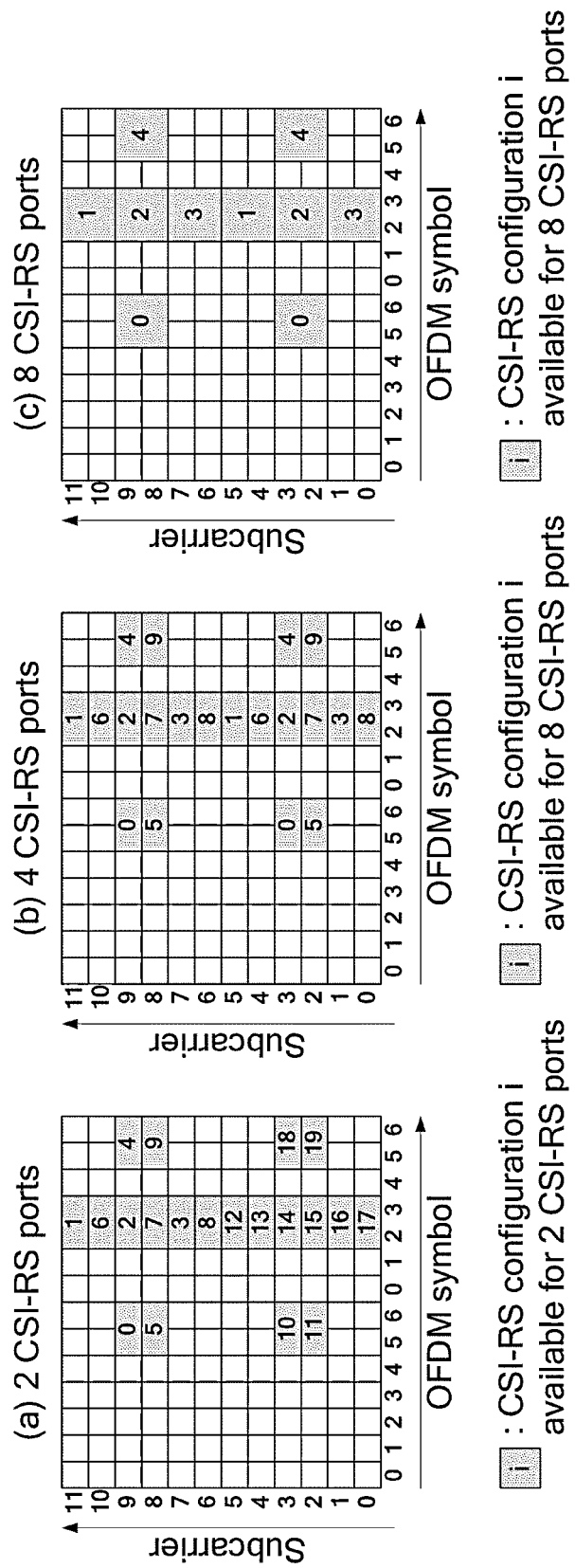

Hereinafter, a DRS transmission in a licensed band will be described with reference to FIGS. 8 to 11. FIG. 8 illustrates a DRS transmission, and FIGS. 9 to 11 illustrate a structure of a reference signal used as a DRS. For convenience, the DRS in the licensed band is referred to as a Rel-12 DRS. The DRS supports small cell on/off, and a SCell that is not active for any user equipment can be turned off except for a DRS periodic transmission. Also, based on the DRS, the user equipment can perform obtaining cell identification information, measuring radio resource management (RRM), and obtaining downlink synchronization.

Referring to FIG. 8, a discovery measurement timing configuration (DMTC) indicates a time window in which a user equipment expects to receive a DRS. The DMTC is fixed to 6 ms. The DMTC period is a transmission period of the DMTC, and may be 40 ms, 80 ms, or 160 ms. The position of the DMTC is specified by a DMTC transmission period and a DMTC offset (in units of subframes), and these information are transmitted to the user equipment through higher layer signaling (e.g., RRC signaling). DRS transmissions occur at the DRS occasion within the DMTC. The DRS occasion has a transmission period of 40 ms, 80 ms or 160 ms, and the user equipment may assume that one DRS occasion is present for every DMTC period. The DRS occasion consists of one to five consecutive subframes in the FDD radio frame and two to five consecutive subframes in the TDD radio frame. The length of the DRS occasion is carried to the user equipment via higher layer signaling (e.g., RRC signaling). The user equipment may assume the DRS existence in the DL subframe within the DRS occasion. The DRS occasion may exist anywhere in the DMTC, but the user equipment expects the transmission interval of the DRSs transmitted from the cell to be fixed (i.e., 40 ms, 80 ms, or 160 ms). That is, the location of the DRS occasion in the DMTC is fixed per cell. The DRS is configured as follows.

Cell-specific Reference Signal (CRS) at antenna port 0 (refer to FIG. 9): It exists within all downlink subframes within the DRS occasion, and within the DwPTS of all special subframes. The CRS is transmitted in the entire band of the subframe.

Primary Synchronization Signal (PSS) (refer to FIG. 10): It exists in the first subframe within the DRS occasion in case of the FDD radio frame, or exists in the second subframe within the DRS occasion in case of the TDD radio frame. The PSS is transmitted through the seventh (or the sixth) OFMDA symbol of the subframe and mapped to six RBs (=72 subcarriers) adjacent to the center frequency.

Secondary Synchronization Signal (SSS) (refer to FIG. 10): It exists in the first subframe within the DRS occasion. The SSS is transmitted through the sixth (or the fifth) OFMDA symbol of the subframe and mapped to six RBs (=72 subcarriers) adjacent to the center frequency.

non-zero-power Channel State Information (CSI)-RS (refer to FIG. 11): It exists in zero or more subframes within the DRS occasion. The location of the non-zero-power CSI-RS is varied according to the number of CSI-RS ports and the higher layer configuration information.

FIG. 8 illustrates a case where the DRS reception time is set to a separate DMTC for each frequency in the user equipment. Referring to FIG. 8, a DRS occasion in length of 2 ms is transmitted for every 40 ms in frequency F1, a DRS occasion of in length of 3 ms is transmitted for every 80 ms in frequency F2, and a DRS occasion in length of 4 ms is transmitted for every 80 ms in frequency F3. The user equipment may identify the starting position of the DRS occasion in the DMTC from the subframe including the SSS. Herein, the frequencies F1 to F3 may be replaced by corresponding cells, respectively.

Example: DRS Transmission Method in Unlicensed Band

Figure 12:
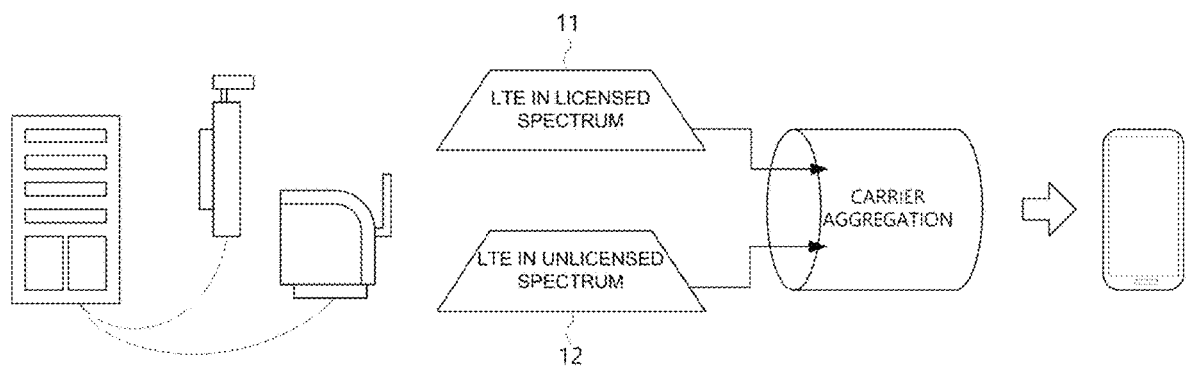
FIG. 12 illustrates a licensed assisted access (LAA) service environment.

FIG. 12 illustrates a licensed assisted access (LAA) service environment.

Referring to FIG. 12, a service environment in which an LTE technology (11) in a conventional licensed band and an LTE technology (12) in an unlicensed band, that is, LTE-unlicensed (LTE-U) or LAA which has been actively discussed recently are connected to each other may be provided to a user. For example, the LTE technology (11) in the licensed band and the LTE technology (12) in the unlicensed band in the LAA environment may be integrated by using a technology such as carrier aggregation, or the like, which may contribute to extension of a network capacity. Further, in an asymmetric traffic structure in which the amount of downlink data is more than that of uplink data, the LAA may provide an optimized LTE service according to various requirements or environments. For convenience, the LTE technology in the licensed band is referred to as LTE-licensed (LTE-L) and the LTE technology in the unlicensed band is referred to as LTE-unlicensed (LTE-U) or LAA.

Figure 13:
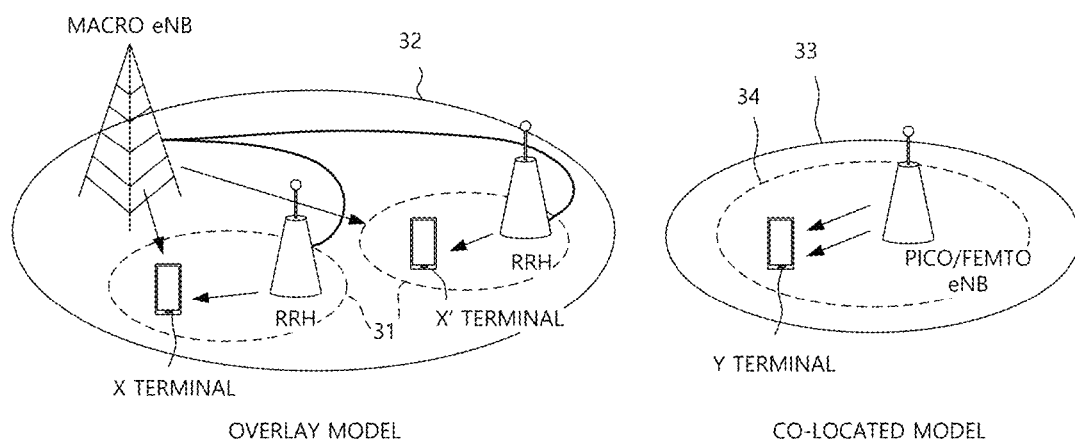
FIG. 13 illustrates a layout scenario of a user equipment and a base station in an LAA service environment.

FIG. 13 illustrates a layout scenario of a user equipment and a base station in an LAA service environment. A frequency band targeted by the LAA service environment has a short wireless communication reach distance due to a high-frequency characteristic. By considering this, the layout scenario of the user equipment and the base station in an environment in which the conventional LTE-L service and the LAA service coexist may be an overlay model or a co-located model.

In the overlay model, a macro base station may perform wireless communication with an X UE and an X' UE in a macro area (32) by using a licensed band carrier and be connected with multiple radio remote heads (RRHs) through an X2 interface. Each RRH may perform wireless communication with an X UE or an X' UE in a predetermined area (31) by using an unlicensed band carrier. The frequency bands of the macro base station and the RRH are different from each other not to interfere with each other, but data needs to be rapidly exchanged between the macro base station and the RRH through the X2 interface in order to use the LAA service as an auxiliary downlink channel of the LTE-L service through the carrier aggregation.

In the co-located model, a pico/femto base station may perform the wireless communication with a Y UE by using both the licensed band carrier and the unlicensed band carrier. However, it may be limited that the pico/femto base station uses both the LTE-L service and the LAA service to downlink transmission. A coverage (33) of the LTE-L service and a coverage (34) of the LAA service may be different according to the frequency band, transmission power, and the like.

When LTE communication is performed in the unlicensed band, conventional equipments (e.g., wireless LAN (Wi-Fi) equipments) which perform communication in the corresponding unlicensed band may not demodulate an LAA message or data. Thus, conventional equipments may determine the LAA message or data as a kind of energy to perform an interference avoidance operation by an energy detection technique. That is, when energy corresponding to the LAA message or data is lower than −62 dBm or certain energy detection (ED) threshold, the wireless LAN equipments may perform communication by disregarding the corresponding message or data. As a result, that user equipment which performs the LTE communication in the unlicensed band may be frequently interfered by the wireless LAN equipments.

Therefore, a specific frequency band needs to be allocated or reserved for a specific time in order to effectively implement an LAA technology/service. However, since peripheral equipments which perform communication through the unlicensed band attempt access based on the energy detection technique, there is a problem in that an efficient LAA service is difficult. Therefore, a research into a coexistence scheme with the conventional unlicensed band device and a scheme for efficiently sharing a radio channel needs to be preferentially made in order to settle the LAA technology. That is, a robust coexistence mechanism in which the LAA device does not influence the conventional unlicensed band device needs to be developed.

Figure 14:
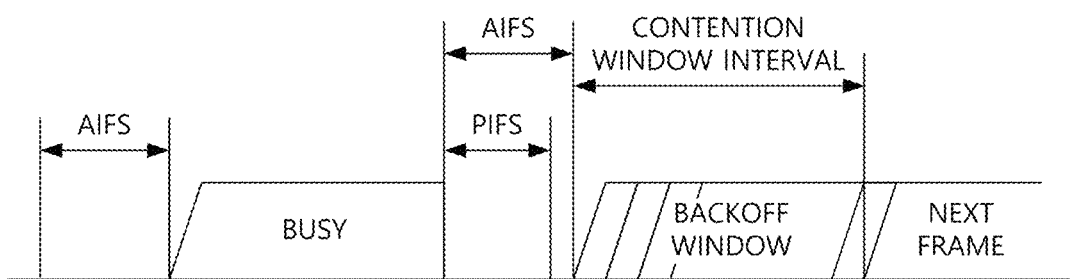
FIG. 14 illustrates a communication scheme that operates in an unlicensed band in the related art.

FIG. 14 illustrates a communication scheme (e.g., wireless LAN) that operates in an unlicensed band in the related art. Since most devices that operate in the unlicensed band operate based on listen-before-talk (LBT), a clear channel assessment (CCA) that senses a channel before data transmission is performed.

Referring to FIG. 14, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a user equipment having data to be transmitted performs a back-off procedure after a defer period (e.g., arbitration interframe space (AIFS), PCF IFS (PIFS), or the like). The defer period means a minimum time when the user equipment needs to wait after the channel is idle. The back-off procedure allows the user equipment to further wait for a predetermined time after the defer period. For example, the user equipment stands by while decreasing a slot time for slot times corresponding to a random number allocated to the user equipment in the contention window (CW) during the channel is in an idle state, and a user equipment that completely exhausts the slot time may attempt to access the corresponding channel.

When the user equipment successfully accesses the channel, the user equipment may transmit data through the channel. When the data is successfully transmitted, a CW size (CWS) is reset to an initial value (CWmin). On the contrary, when the data is unsuccessfully transmitted, the CWS increases twice. As a result, the user equipment is allocated with a new random number within a range which is twice larger than a previous random number range to perform the back-off procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since most communications in the unlicensed band in the related art operate based on the LBT, the LTE also considers the LBT in the LAA for coexistence with the conventional device. In detail, in the LTE, the channel access method on the unlicensed band may be divided into 4 following categories according to the presence/an application scheme of the LBT.

Category 1: No LBT
An LBT procedure by a Tx entity is not performed.

Category 2: LBT without Random Back-Off
A time interval in which the channel needs to be sensed in an idle state before the Tx entity performs a transmission on the channel is decided. The random back-off is not performed.

Category 3: LBT with Random Back-Off with a CW of Fixed Size
LBT method that performs random back-off by using a CW of a fixed size. The Tx entity has a random number N in the CW and the CW size is defined by a minimum/maximum value of N. The CW size is fixed. The random number N is used to decide the time interval in which the channel needs to be sensed in an idle state before the Tx entity performs a transmission on the channel.

Category 4: LBT with Random Back-Off with a CW of Variable Size
LBT method that performs the random back-off by using a CW of a variable size. The Tx entity has the random number N in the CW and the CW size is defined by the minimum/maximum value of N. The Tx entity may change the CW size at the time of generating the random number N. The random number N is used to decide the time interval in which the channel needs to be sensed in an idle state before the Tx entity performs a transmission on the channel.

Figure 15:
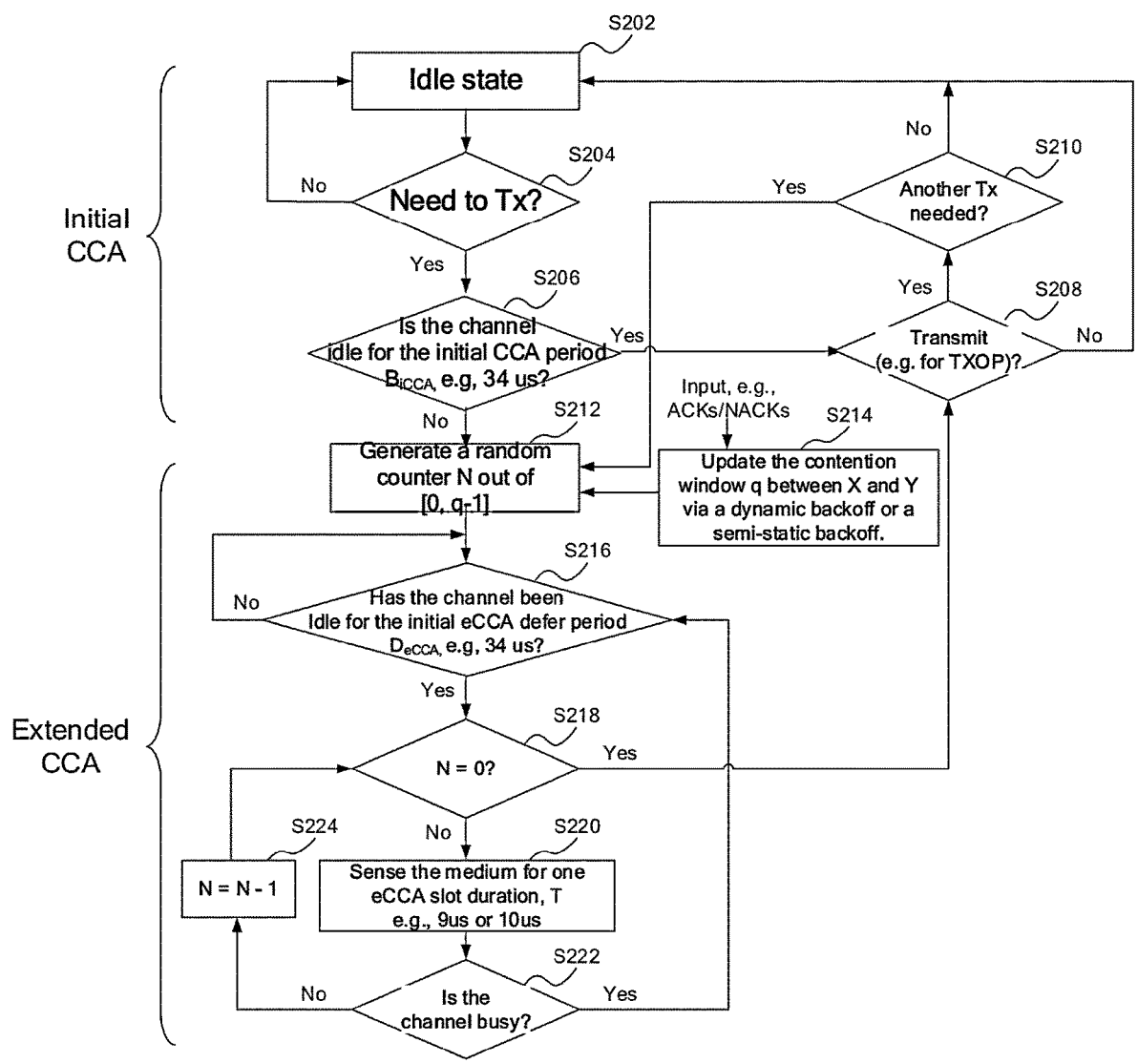
FIGS. 15 and 16 illustrate a listen-before-talk (LBT) process for a DL transmission.
Figure 16:
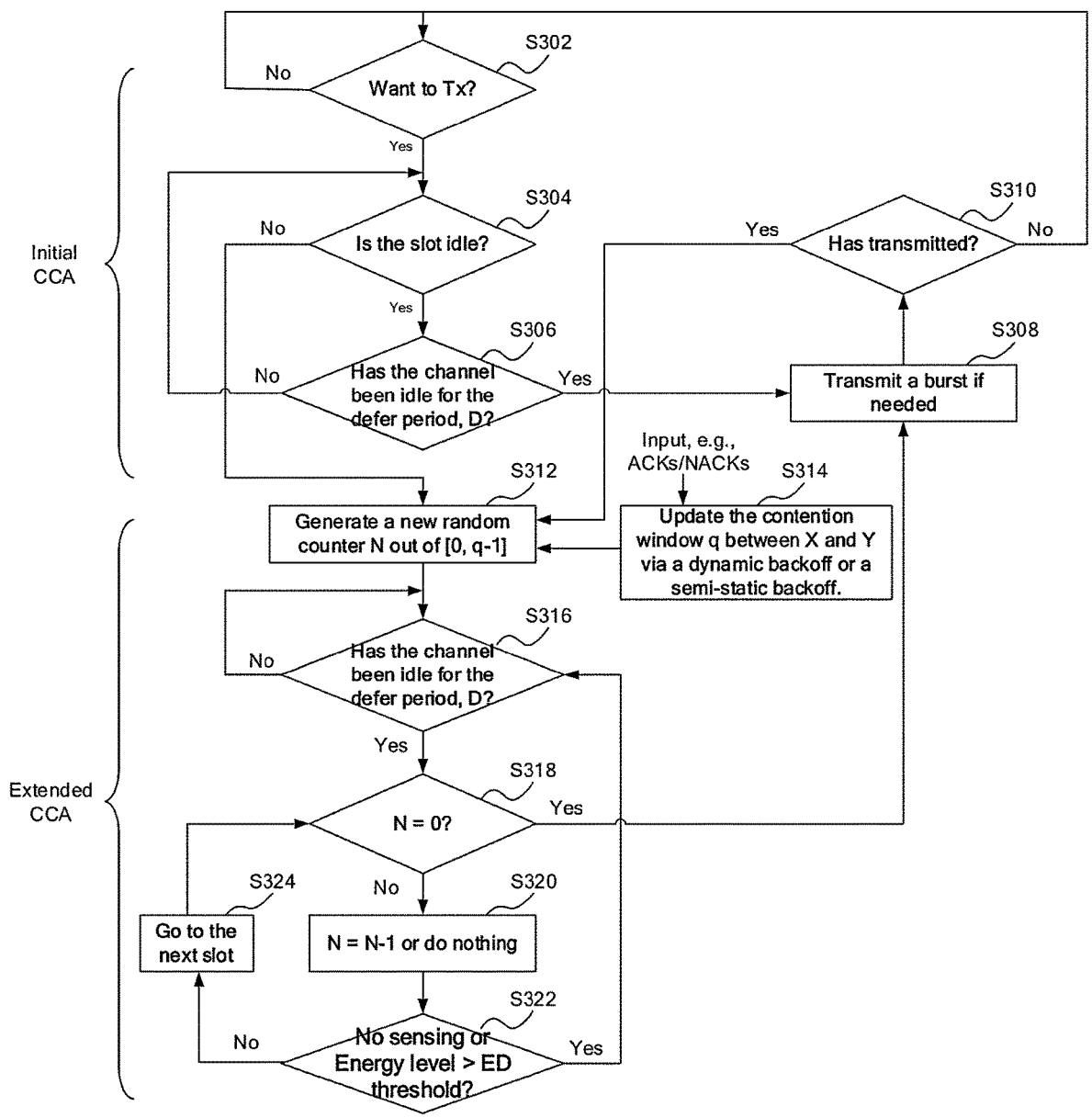

FIGS. 15 to 16 illustrate a DL transmission process based on the category 4 LBT. The category 4 LBT may be used to guarantee fair channel access with Wi-Fi. Referring to FIGS. 15 to 16, the LBT process includes initial CCA (ICCA) and extended CCA (ECCA). In the ICCA, the random back-off is not performed and in the ECCA, the random back-off is performed by using the CW of the variable size. The ICCA is applied to the case in which the channel is idle when signal transmission is required and the ECCA is applied to the case in which the channel is busy when the signal transmission is required or DL transmission is performed just before. That is, it is determined whether the channel is idle through the ICCA, and data transmission is performed after the ICCA period. If the interference signal is detected and data transmission fails, a data transmission timing can be obtained through a defer period+back-off counter after setting a random back-off counter.

Referring to FIG. 12, a signal transmitting process may be performed as follows.

Initial CCA

S202: The base station verifies that the channel is idle.

S204: The base station verifies whether the signal transmission is required. When the signal transmission is not required, the process returns to S202 and when the signal transmission is required, the process proceeds to S206.

S206: The base station verifies whether the channel is idle for an ICCA defer period ($B_{CCA}$). The ICCA defer period is configurable. As an implementation example, the ICCA defer period may be constituted by an interval of 16 is and n consecutive CCA slots. Herein, n may be a positive integer and one CCA slot interval may be 9 μs. The number of CCA slots may be configured differently according to a QoS class. The ICCA defer period may be set to an appropriate value by considering a defer period (e.g., DIFS or AIFS) of Wi-Fi. For example, the ICCA defer period may be 34 us. When the channel is idle for the ICCA defer period, the base station may perform the signal transmitting process (S208). When it is determined that the channel is busy during the ICCA defer period, the process proceeds to S212 (ECCA).

S208: The base station may perform the signal transmitting process. When the signal transmission is not performed, the process proceeds to S202 (ICCA) and when the signal transmission is performed, the process proceeds to S210. Even in the case where a back-off counter N reaches 0 in S218 and S208 is performed, when the signal transmission is not performed, the process proceeds to S202 (ICCA) and when the signal transmission is performed, the process proceeds to S210.

S210: When additional signal transmission is not required, the process proceeds to S202 (ICCA) and when the additional signal transmission is required, the process proceeds to S212 (ECCA).

Extended CCA

S212: The base station generates the random number N in the CW. N is used as a counter during the back-off process and generated from [0, q−1]. The CW may be constituted by q ECCA slots and an ECCA slot size may be 9 μs or 10 μs. The CW size (CWS) may be defined as q and be variable in S214. Thereafter, the base station proceeds to S216.

S214: The base station may update the CWS. The CWS q may be updated to a value between X and Y. The X and Y values are configurable parameters. CWS update/adjustment may be performed whenever N is generated (dynamic back-off) and semi-statically performed at a predetermined time interval (semi-static back-off). The CWS may be updated/adjusted based on exponential back-off or binary back-off. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S216: The base station verifies whether the channel is idle for an ECCA defer period (DeCCA). The ECCA defer period is configurable. As an implementation example, the ECCA defer period may be constituted by an interval of 16 is and n consecutive CCA slots. Herein, n may be a positive integer and one CCA slot interval may be 9 μs. The number of CCA slots may be configured differently according to the QoS class. The ECCA defer period may be set to the appropriate value by considering the defer period (e.g., DIFS or AIFS) of Wi-Fi. For example, the ECCA defer period may be 34 us. When the channel is idle for the ECCA defer period, the base station proceeds to S218. When it is determined that the channel is busy during the ECCA defer period, the base station repeats S216.

S218: The base station verifies whether N is 0. When N is 0, the base station may perform the signal transmitting process (S208). In this case, (N=0), the base station may not immediately perform transmission and performs CCA check for at least one slot to continue the ECCA process. When N is not 0 (that is, N>0), the process proceeds to S220.

S220: The base station senses the channel during one ECCA slot interval (T). The ECCA slot size may be 9 μs or 10 μs and an actual sensing time may be at least 4 μs.

S222: When it is determined that the channel is idle, the process proceeds to S224. When it is determined that the channel is busy, the process returns to S216. That is, one ECCA defer period is applied again after the channel is idle and N is not counted during the ECCA defer period.

S224: N is decreased by 1 (ECCA countdown).

FIG. 16 is substantially the same as/similar to the transmitting process of FIG. 15 and is different from FIG. 15 according to an implementation scheme. Therefore, detailed matters may be described with reference to contents of FIG. 15.

S302: The base station verifies whether the signal transmission is required. When the signal transmission is not required, S302 is repeated and when the signal transmission is required, the process proceeds to S304.

S304: The base station verifies whether the slot is idle. When the slot is idle, the process proceeds to S306 and when the slot is busy, the process proceeds to S312 (ECCA). The slot may correspond to the CCA slot in FIG. 15.

S306: The base station verifies whether the channel is idle for a defer period (D). D may correspond to the ICCA defer period in FIG. 15. When the channel is idle for the defer period, the base station may perform the signal transmitting process (S308). When it is determined that the channel is busy during the defer period, the process proceeds to S304.

S308: The base station may perform the signal transmitting process if necessary.

S310: When the signal transmission is not performed, the process proceeds to S302 (ICCA) and when the signal transmission is performed, the process proceeds to S312 (ECCA). Even in the case where the back-off counter N reaches 0 in S318 and S308 is performed, when the signal transmission is not performed, the process proceeds to S302 (ICCA) and when the signal transmission is performed, the process proceeds to S312 (ECCA).

Extended CCA

S312: The base station generates the random number N in the CW. N is used as the counter during the back-off process and generated from [0, q−1]. The CW size (CWS) may be defined as q and be variable in S314. Thereafter, the base station proceeds to S316.

S314: The base station may update the CWS. The CWS q may be updated to the value between X and Y. The X and Y values are configurable parameters. CWS update/adjustment may be performed whenever N is generated (dynamic back-off) and semi-statically performed at a predetermined time interval (semi-static back-off). The CWS may be updated/adjusted based on exponential back-off or binary back-off. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S316: The base station verifies whether the channel is idle for the defer period (D). D may correspond to the ECCA defer period in FIG. 15. D in S306 and D in S316 may be the same as each other. When the channel is idle for the defer period, the base station proceeds to S318. When it is determined that the channel is busy during the defer period, the base station repeats S316.

S318: The base station verifies whether N is 0. When N is 0, the base station may perform the signal transmitting process (S308). In this case, (N=0), the base station may not immediately perform transmission and performs CCA check during at least one slot to continue the ECCA process. When N is not 0 (that is, N>0), the process proceeds to S320.

S320: The base station selects one of an operation of decreasing N by 1 (ECCA count-down) and an operation of not decreasing N (self-deferral). The self-deferral operation may be performed according to implementation/selection of the base station. The base station does not perform sensing for energy detection and not perform even ECCA countdown in the self-deferral.

S322: The base station may select one of the operation not performing sensing for energy detection and the energy detecting operation. When the sensing for the energy detection is not performed, the process proceeds to S324. When the energy detecting operation is performed, if an energy level is equal to or lower than an energy detection threshold (that is, idle), the process proceeds to S324. If the energy level is higher than the energy detection threshold (that is, busy), the process returns to S316. That is, one defer period is applied again after the channel is idle and N is not counted during the defer period.

S324: The process proceeds to S318.

Figure 17:
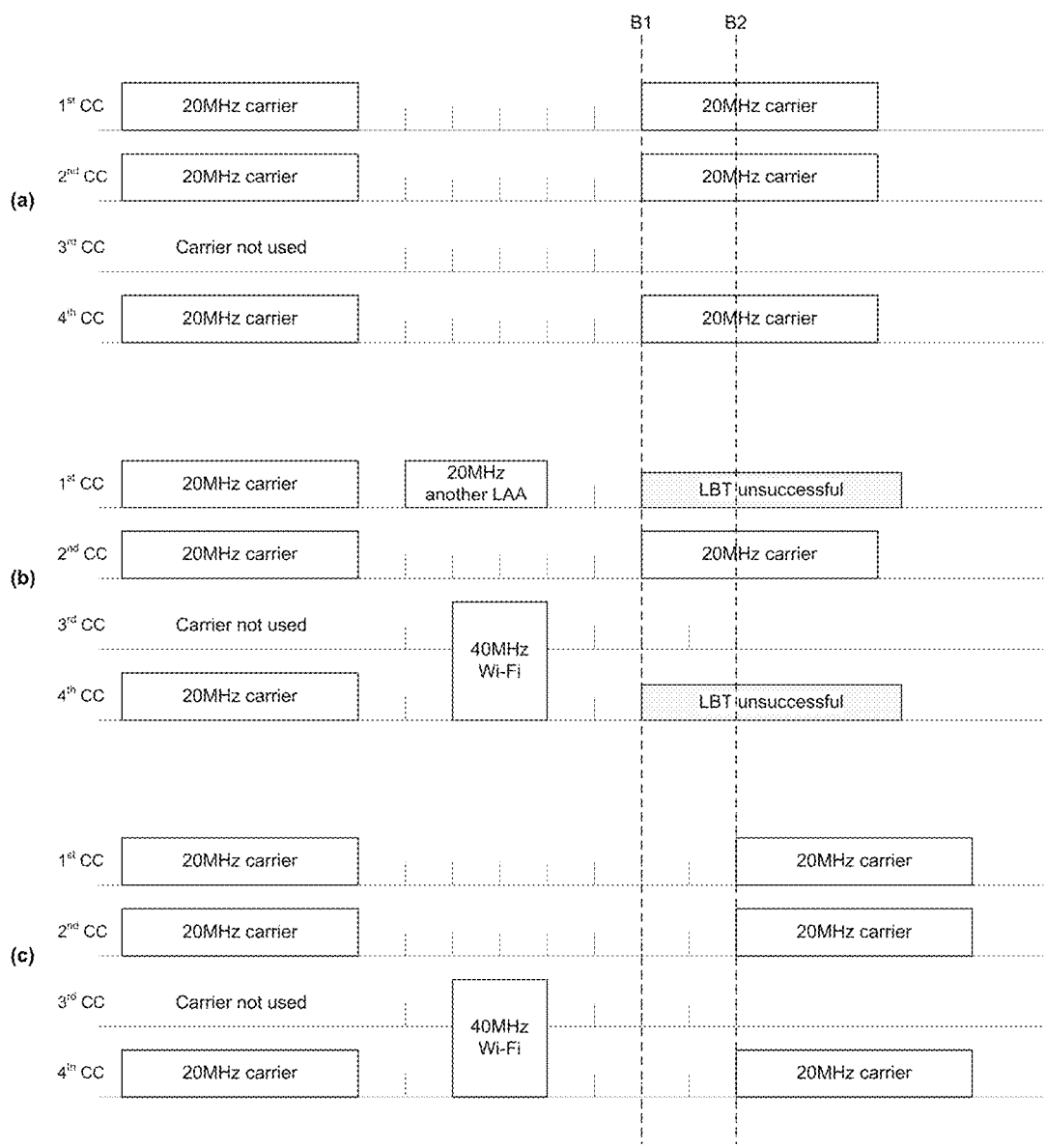
FIGS. 17 and 18 illustrate LBT-based data transmission methods on multiple carriers.
Figure 18:
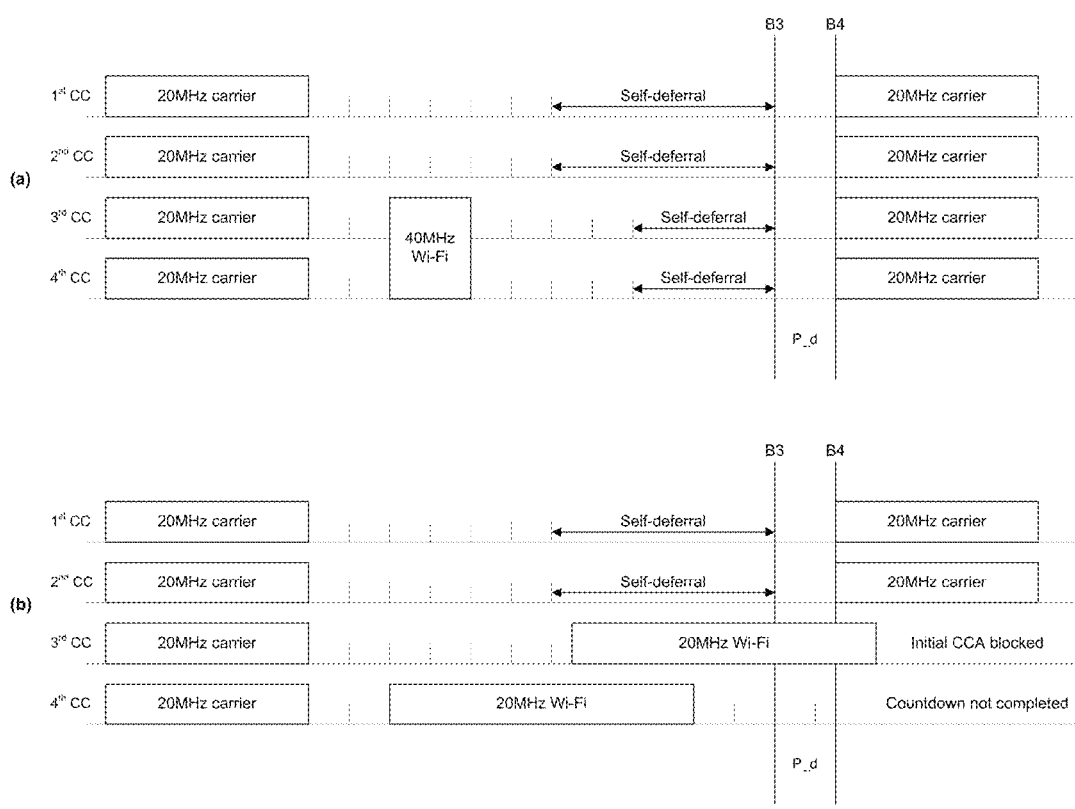

FIGS. 17 and 18 illustrate LBT-based data transmission methods on multiple carriers. In the embodiments of FIGS. 17 and 18, multiple carriers including at least one of a first component carrier (hereinafter referred to as a first CC), a second component carrier (hereinafter referred to as a second CC), a third component carrier (hereinafter referred to as a third CC), and a fourth component carrier (hereinafter referred to as a fourth CC) is used. According to an embodiment of the present invention, the multiple carriers may be composed of contiguous component carriers. However, according to another embodiment of the present invention, the multiple carriers may be configured to include non-contiguous component carriers. As described above, in the embodiment of the present invention, the data transmitted by the base station through each component carrier includes at least one of the PDCCH and the PDSCH. In addition, the component carrier may denote a channel of 20 MHz or a subchannel of 20 MHz or less. According to an embodiment of the present invention, the multiple carriers on which data transmission is performed may include at least one licensed band component carrier and at least one unlicensed band component carrier.

FIG. 17 illustrates a method of transmitting LBT-based multi-carrier data according to an embodiment of the present invention. In the embodiment of FIG. 17, the base station attempts to transmit data through multiple carriers including the first CC, the second CC, and the fourth CC. The base station may perform an independent back-off for each 20 MHz carrier. The base station performs data transmission based on the back-off procedure performed independently for each carrier. In the embodiment of FIG. 17, it is assumed that the same back-off counter is allocated for the back-off procedure of each carrier. Furthermore, in the FIG. 17, B1 indicates a time point when the back-off is completed without interference, and B2 indicates a back-off completion time delayed due to interference during the back-off.

First, referring to FIG. 17(a), interference has not occurred in all carriers in which the back-off is performed. Thus, the back-off of the first CC, the second CC and the fourth CC is simultaneously completed at B1. The base station simultaneously transmits data through the first CC, the second CC and the fourth CC at the time point B1.

Referring to FIG. 17(b), interference has occurred in the first CC and the fourth CC during the back-off of each carrier. Thus, the back-off of the second CC is completed at B1, but the back-off of the first CC and the fourth CC is not completed at B1. According to the embodiment of FIG. 17(b), the base station may transmit data only through a carrier in which the back-off has been completed without interference. That is, the base station may transmit data at B1 only through the second CC in which interference has not occurred. On the other hand, the base station may determine that the back-off of the first CC and the fourth CC has failed and resume the back-off of the first CC and the fourth CC in the next transmission opportunity.

Next, referring to FIG. 17(c), interference has occurred in the fourth CC during the back-off of each carrier. Thus, the back-off of the first CC and the second CC is completed at B1, but the back-off of the fourth CC is not completed at B1. The completion time of the back-off of the fourth CC is delayed to B2. According to the embodiment of FIG. 17(c), the base station may postpone the data transmission until the back-off of some or all of the carriers in which interference has occurred is completed. That is, the base station may simultaneously transmit data when the back-off of some or all of the carriers in which interference has occurred is completed. To this end, the base station performs an additional back-off in the first CC and the second CC until the time point B2 at which the back-off of the fourth CC is completed. The base station simultaneously transmits data through the first CC, the second CC and the fourth CC at the time point B2. Thus, by performing an additional back-off, the base station may transmit data through a wider bandwidth.

FIG. 18 illustrates a method for synchronizing LBT-based multi-carrier data transmissions using a self-deferral. In the embodiment of FIG. 18, the base station attempts to transmit data through multiple carriers including the first CC, the second CC, the third CC and the fourth CC. The base station may perform an independent back-off for each 20 MHz carrier.

According to the embodiment of the present invention, the base station (hereinafter, the same applies to the user equipment) may perform a self-deferral for multi-carrier data transmission. The self-deferral indicates an operation in which the base station does not arbitrarily decrease a back-off counter while performing a back-off. That is, the base station may not arbitrarily decrease the back-off counter even when the carrier is idle. The base station may synchronize back-off completion times of multiple carriers by deferring a back-off of at least one component carrier in the CCA procedure of multiple carriers. The base station may simultaneously transmit data through multiple carriers after a predetermined time from the back-off of multiple carriers is completed. In FIG. 18, B3 denotes a multi-carrier back-off completion time synchronized based on the self-deferral, and B4 denotes the synchronized multi-carrier transmission time point of the base station. According to an embodiment, B4 denotes a time point after a predetermined defer period (P_d) from B3. According to another embodiment, B4 may be set to the same time point as B3.

First, referring to FIG. 18(a), an interference has occurred in the third CC and the fourth CC while performing the back-off for the first CC through the fourth CC. Therefore, when a general back-off procedure is performed, the back-off of the third CC and the fourth CC may not be completed when the back-off of the first CC and the second CC is completed. The base station performs a self-deferral to synchronize the back-off completion time of multiple carriers. According to an embodiment, the duration of the self-deferral may be determined within a predetermined time range. Various embodiments for setting the self-deferral period will be described later. FIG. 18(a) shows an embodiment in which the self-deferral is performed in all the component carriers constituting the multiple carriers. However, the specific implementation method of the self-deferral is not limited thereto and can be extended to various embodiments described below. Thus, by performing the self-deferral of at least one component carrier, the back-off completion time of multiple carriers may be synchronized to B3.

When the back-off procedure of the multiple carriers is completed, the base station may perform an additional CCA for a predetermined defer period P_d. In the embodiment of the present invention, the defer period P_d may be defined in various ways. The defer period P_d is composed of at least one slot. According to an embodiment, the defer period P_d may be set equal to the ICCA defer period described above. That is, the defer period P_d may be constituted by a period of 16 μs and n consecutive slots. Here, n is a positive integer and one slot has a length of 9 μs. n may be set based on a QoS class of data to be transmitted.

The base station performs a multi-carrier data transmission at B4, i.e., after the defer period P_d from the synchronized multi-carrier back-off completion time B3. In this case, data may be transmitted only through component carrier(s) which is idle for the above defer period P_d after the back-off is completed. In the embodiment of FIG. 18(a), the back-off of the component carrier in which interference has occurred, that is, the third CC and the fourth CC is completed before B3, and the first CC through the fourth CC are determined to be idle during the defer period P_d. Therefore, the base station simultaneously transmits data on the first CC through the fourth CC. In this manner, the base station may transmit data through a wider bandwidth by performing the self-deferral.

Meanwhile, according to the embodiment of the present invention, the additional CCA for the defer period P_d may be omitted depending on the transmission condition of the base station. For example, the base station may perform the additional CCA during the defer period P_d only for carriers not participating in data transmission on multiple carriers. More specifically, back-off of the first component carrier may be completed before performing a simultaneous transmission of data through multiple carriers, but data transmission through the first component carrier may not be performed during the simultaneous transmission. If the data transmission through the first component carrier is prepared later, the base station may transmit data after performing only an additional CCA for the defer period P_d. That is, if the first component carrier is idle for the defer period P_d, the base station may immediately transmit data through the first component carrier.

According to the embodiment of FIG. 18(b), the interference occurred in a specific carrier constituting the multiple carriers may be longer than a certain length. The base station performs a self-deferral for synchronization of the back-off completion times of the first CC through the fourth CC, but due to interference, the third CC is in a busy state until B3 and subsequent defer period P_d. In addition, the back-off of the fourth CC may not be completed until the time point B3. In this manner, when the back-off is not completed until the synchronized back-off completion time B3 or when a carrier in a busy state during the predetermined defer period P_d is present, the base station performs the multi-carrier data transmission excluding the corresponding carrier. That is, the base station may transmit data through some component carriers which are idle for the predetermined defer period P_d after the back-off is completed until the synchronized back-off completion time B3.

According to the embodiment of the present invention, the self-deferral period may be set according to various embodiments. The base station may adjust the self-deferral period of each component carrier within a maximum self-deferral period based on at least one variable.

According to the embodiment of the present invention, the base station may set or adjust the self-deferral period when a specific carrier is busy during the back-off. According to an embodiment of the present invention, the base station may perform the setting, adjustment and/or cancellation of the self-deferral based on a length of the interference. If the length of the interference occurred during the back-off is longer than a predetermined first threshold, the base station may expect the back-off completion time to be delayed and set the self-deferral period longer. However, if the length of the interference occurred during the back-off is longer than a predetermined second threshold, the base station may reduce the self-deferral period or cancel the self-deferral. The base station may perform data transmission through the corresponding component carrier when the back-off of a particular component carrier is completed. In this case, the second threshold is larger than the first threshold. According to a further embodiment of the present invention, the self-deferral period may be varied based on a bandwidth of the interference. The larger the bandwidth of the interference is, the shorter the length of the interference may be. Therefore, the base station may shorten the self-deferral period as the bandwidth of the interference is larger. If the base station has acquired the bandwidth information of the interference, it may perform setting, adjustment and/or cancellation of the self-deferral based on the information.

The base station may set or adjust a self-deferral period of a first carrier based on a length of the interference in a second carrier. Here, the first carrier and the second carrier denote different carriers with each other. Further, each of the first carrier and the second carrier includes at least one component carrier. If the interference in the second carrier is prolonged, the back-off completion time of the first carrier in which the self-deferral is performed may be delayed. Thus, the base station may gradually reduce or suspend the self-deferral period of the first carrier based on the length of the interference in the second carrier. When the self-deferral and the back-off of the first carrier are completed, the base station may immediately transmit data through the first carrier. Alternatively, the base station may transmit the data after performing a CCA of the corresponding carrier for a defer period after the self-deferral and the back-off are completed.

The base station may estimate the length of the interference in the second carrier in a various ways. According to an embodiment, the base station may determine that the length of the interference is equal to or greater than the second threshold when the second carrier is maintained to be busy for greater than or equal to a predetermined number of slots. When the second carrier is continuously busy in this manner, the base station may gradually reduce or suspend the self-deferral period of the first carrier. When the self-deferral period and the back-off of the first carrier are completed, the base station may transmit data immediately or after the defer period through the first carrier. In this manner, the base station may prevent unnecessary delay of data transmission of other carriers due to interference occurred in a specific carrier.

According to another embodiment of the present invention, the base station may adjust the self-deferral period based on the number of active carriers in the configurable unlicensed band. The larger the number of active carriers is, the higher the probability of the interference is. Therefore, the base station may set the self-deferral period shorter as the number of active carriers is larger.

According to yet another embodiment of the present invention, the base station may adjust the self-deferral period based on the number of carriers on which the self-deferral is performed. For example, the base station may set the self-deferral period shorter as the number of carriers on which the self-deferral is performed is larger. Alternatively, the base station may set the self-deferral period shorter as a value of 'the number of carriers on which the self-deferral is performed'/'the number of active carriers' is higher. In this manner, the base station may save resources by adjusting the self-deferral period based on the number of carriers on which the self-deferral is performed.

The base station may gradually reduce or extend the self-deferral period based on the length of the interference. In addition, if the gradually extended self-deferral period exceeds a certain level, the base station may cancel the self-deferral. According to an embodiment, the self-deferral period may be divided into X intervals. For example, the self-deferral period may be divided into X intervals of equal length. Alternatively, the self-deferral period may be divided into X intervals that are exponentially increased or decreased. Alternatively, the self-deferral period may be divided into X intervals that are increased or decreased by a certain multiple. The base station may cancel the self-deferral if an interference has occurred consecutively in Y intervals among the divided X intervals. In this case, Y is a value of X or less. The base station may resume the back-off of the carrier for which the self-deferral has been canceled. When the self-deferral and the back-off of the carrier are completed, the base station may immediately transmit data through the carrier. According to another embodiment, the base station may transmit the data after performing a CCA of the carrier for a defer period after the self-deferral and the back-off are completed.

Figure 19:
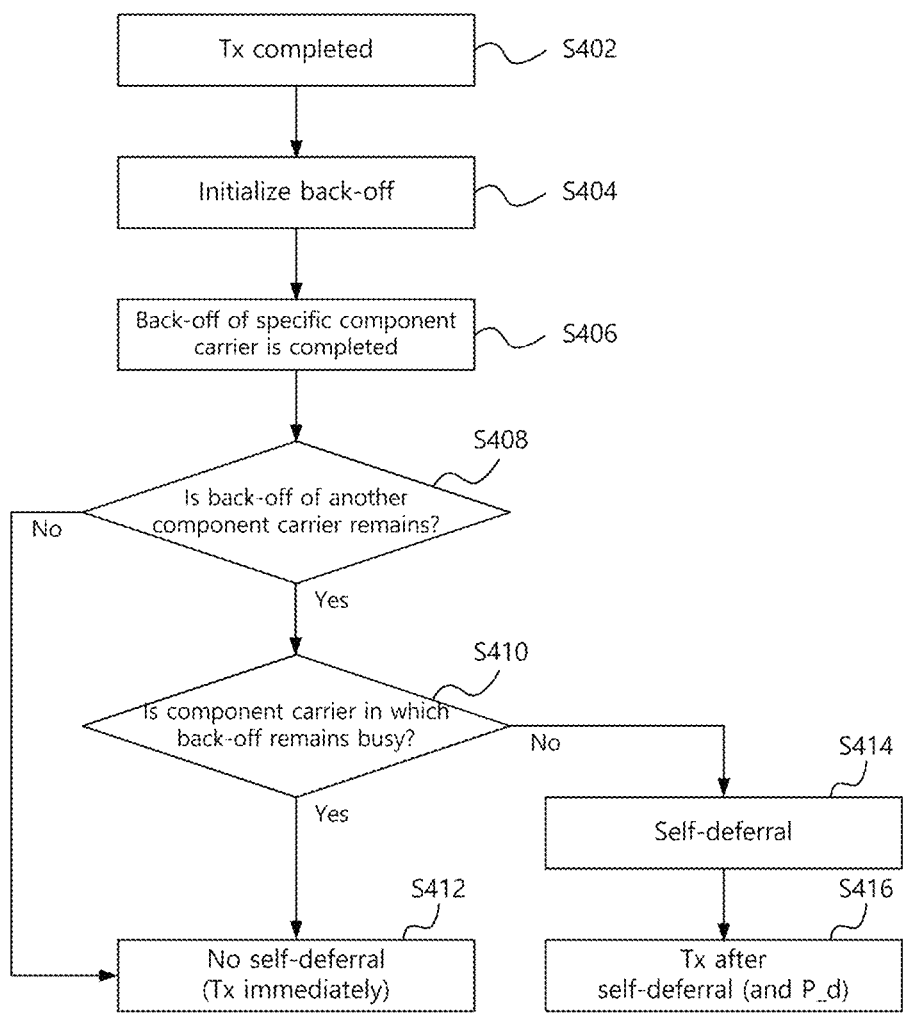
FIG. 19 is a flowchart illustrating an embodiment in which a base station performs a self-deferral.

FIG. 19 is a flowchart illustrating an embodiment in which a base station performs a self-deferral. When a transmission of the previous data is completed (S402), the base station initializes the back-off counter (S404). The base station performs multi-carrier back-off based on the initialized back-off counter. According to an embodiment, the base station may perform independent back-off for each carrier.

When a back-off of a specific carrier is completed (S406), the base station verifies whether a back-off of another carrier remains (S408). If there is no carrier in which the back-off counter remains at the time when the back-off of the specific carrier is completed, the base station may perform data transmission through all the carriers without self-deferral (S412). However, if there is a carrier in which the back-off counter remains at the time when the back-off of the specific carrier is completed, the base station verifies whether the carrier in which the back-off remains is busy (S410). That is, the base station may determine whether to perform the self-deferral based on whether or not the carrier in which the back-off is not completed is busy. When the carrier in which the back-off is not completed is busy, the base station does not perform the self-deferral and immediately transmits data through carrier(s) in which the back-off is completed (S412). However, when the carrier in which the back-off is not completed is idle, the base station may perform the self-deferral (S414). When the self-deferral and the back-off are completed, the base station may perform a multi-carrier data transmission (S416). As described above, the base station may additionally perform a CCA of the carrier for the defer period P_d before the data transmission depending on the situation.

The base station may determine whether to perform the self-deferral based on at least one variable. In one embodiment, the base station may determine whether to perform the self-deferral based on at least one of the remaining back-off counter value bo_remaining of the carrier in which the back-off is not completed and the number of carriers n_remaining in which the back-off is not completed. The base station may perform the self-deferral when the back-off in the first carrier is completed and the bo_remaining value of the second carrier is less than or equal to a predetermined value bo_threshold. Further, the base station may perform the self-deferral only when the back-off in the first carrier is completed and the n_remaining value is equal to or greater than a predetermined value. If the number of carriers in which the back-off is not completed is small, the bandwidth gain may not be large compared to the channel occupancy delay due to performing the self-deferral. If it is determined not to perform the self-deferral, the base station may immediately perform data transmission through the carrier(s) in which the back-off is completed.

Meanwhile, the bo_threshold value may be set to be smaller as a back-off stage of the corresponding carrier is higher. When the back-off stage becomes high since the specific carrier becomes busy, a back-off counter is assigned within an increased CW. When a high back-off counter is assigned within the increased CW, the probability that the carrier will become busy again increases. Also, the high back-off stage may indicate that a traffic load of the corresponding carrier is high. Therefore, the base station may perform a fast carrier access by setting the bo_threshold value of the corresponding component carrier to a low value.

Meanwhile, FIG. 19 illustrates an embodiment in which a base station performs a self-deferral, and the present invention is not limited thereto. That is, the individual conditions for the base station to perform the self-deferral may be variously changed.

Figure 20:
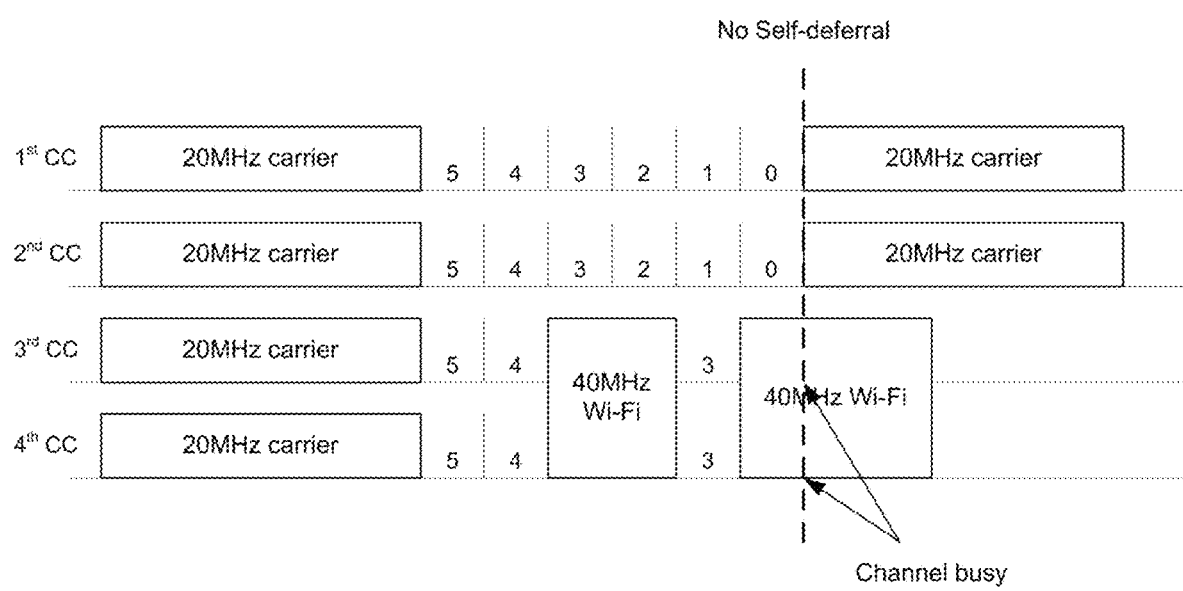
FIG. 20 illustrates an embodiment in which a base station determines whether to perform a self-deferral according to the method of FIG. 19.

FIG. 20 illustrates an embodiment in which a base station determines whether to perform a self-deferral according to the method of FIG. 19. The base station attempts to transmit data through multiple carriers including the first CC through the fourth CC. The base station performs independent back-off for each component carrier. As illustrated, interference has occurred in the third CC and the fourth CC while performing the back-off for the first CC through the fourth CC. Therefore, the back-off of the third CC and the fourth CC may not be completed at the time when the back-off of the first CC and the second CC is completed. In the embodiment of FIG. 20, the third CC and the fourth CC are busy at the back-off completion time of the first CC and the second CC. Therefore, the base station may transmit data only through the first CC and the second CC in which the back-off is completed without performing the self-deferral.

Figure 21:
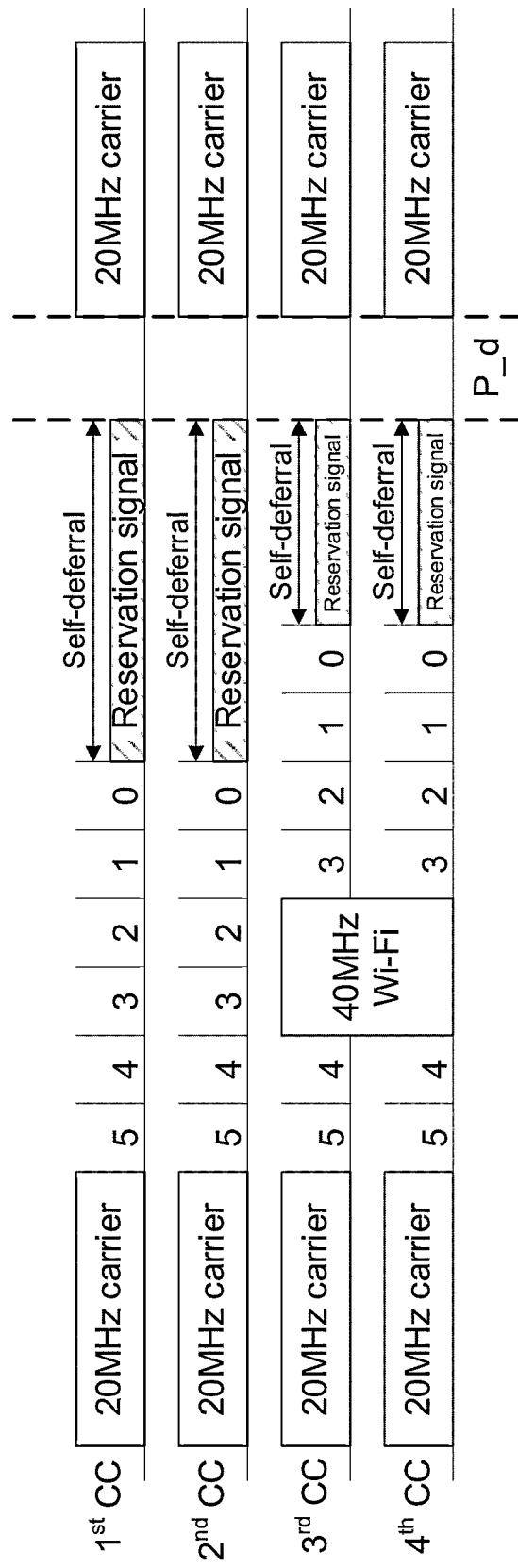
FIGS. 21 and 22 illustrate embodiments of the present invention for protecting a carrier on which a self-deferral is performed with a reserved signal.
Figure 22:
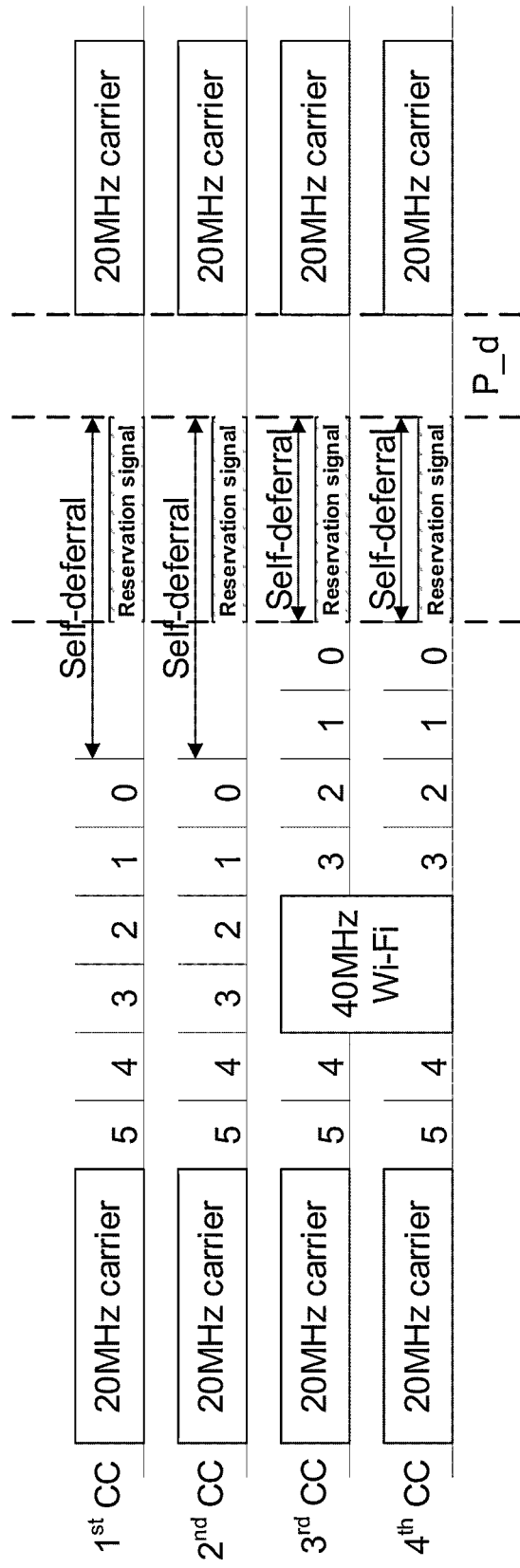

FIGS. 21 and 22 illustrate embodiments of the present invention for protecting a carrier on which a self-deferral is performed with a reserved signal.

As described above, when the back-off completion times between the carriers are not the same due to the interference, the base station may perform the self-deferral to increase the number of carriers in which back-off is completed and transmit data through a wider bandwidth. However, if the carrier is not used during the self-deferral, another device may determine that the corresponding carrier is idle and use it. If a signal transmission of another device continues until the end of the self-deferral, the base station cannot be able to perform data transmission through the carrier.

Therefore, according to the embodiment of the present invention, the base station may transmit a reserved signal while the self-deferral is performed, thereby preventing another device from occupying the carrier. In the embodiment of the present invention, the reserved signal includes a dummy signal having a specific power or more, a signal having specific information, or the like.

First, FIG. 21 illustrates an embodiment in which a base station transmits a reserved signal in a self-deferral period. According to an embodiment of the present invention, the base station may transmit a reserved signal for the entire period during which the self-deferral is performed in each carrier. As shown in FIG. 21, the time during which the self-deferral is performed may be different for each of the component carriers constituting the multiple carriers. The base station independently transmits the reserved signal during the self-deferral period of each component carrier.

On the other hand, due to the transmission of the reserved signal of the base station, the carrier on which the self-deferral is performed may become unnecessarily busy. Thus, the base station may determine whether to perform the self-deferral based on at least one variable as described above. For example, if the number of carriers n_complete in which the back-off is completed is greater than or equal to a predetermined value (alternatively, the number of carriers n_remaining in which the back-off is not completed is less than a predetermined value), the base station may not perform the self-deferral. If the self-deferral is performed on a specific carrier, the base station may cancel the self-deferral of the corresponding carrier. If it is determined not to perform the self-deferral, the base station may immediately perform data transmission through the carrier(s) in which the back-off is completed.

Next, FIG. 22 illustrates another embodiment in which the base station transmits a reserved signal in a self-deferral period. When a reserved signal is transmitted, power leakage to adjacent carriers may occur. If the reserved signal is transmitted for the entire period during which the self-deferral is performed in each carrier, as in the embodiment of FIG. 21, the back-off of adjacent carriers may be affected. That is, the power leakage of the reserved signal transmitted through the first carrier may causes the busy state of the second carrier, thereby the back-off of the second carrier being interrupted.

Therefore, according to another embodiment of the present invention, the base station may transmit the reserved signal through each of the component carriers only when the self-deferral is performed on all the component carriers constituting the multiple carriers. In the embodiment of FIG. 22, since the self-deferral of the third CC and the fourth CC is not performed at the start time of the self-deferral of the first CC and the second CC, the base station does not transmit the reserved signal. When the self-deferral of the third CC and the fourth CC is started and the self-deferral is performed on all the component carriers, the base station may transmit the reserved signal through the first CC through the fourth CC.

According to yet another embodiment of the present invention, the base station may transmit the reserved signal based on whether the back-off is performed on an adjacent carrier. The power leakage due to the signal transmission may only affect adjacent channels. Thus, even if the self-deferral is not being performed on all carriers, the base station may transmit the reserved signal through the carrier on which the self-deferral is performed when the back-off is not being performed on the adjacent carrier.

Figure 23:
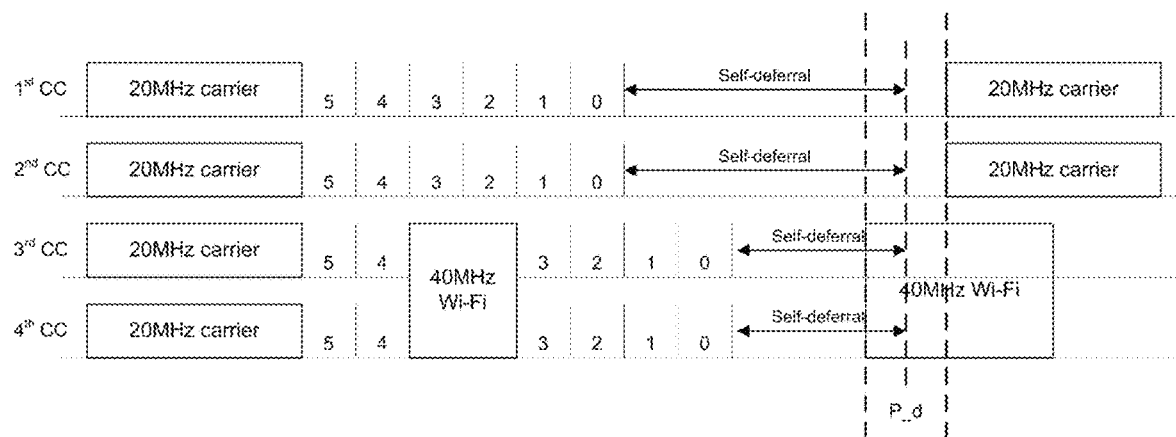
FIG. 23 illustrates an embodiment in which a base station cancels a self-deferral.

FIG. 23 illustrates an embodiment in which a base station cancels a self-deferral. As described above, the base station may perform the self-deferral for a multi-carrier data transmission. However, when interference has occurred in at least some carriers within the self-deferral period, the base station may cancel the self-deferral. That is, when interference has occurred in the self-deferral period, the base station cancels the self-deferral of the entire carriers to reduce the waiting time for a data transmission due to the interference. After the self-deferral is canceled, the base station may immediately perform data transmission through the carrier(s) in which the back-off is completed. According to an embodiment, the base station may transmit data after performing an additional CCA of the carrier during the defer period P_d. In the embodiment of FIG. 23, interference has occurred in the third CC and the fourth CC while the self-deferral of the first CC through the fourth CC is performed. Therefore, the base station cancels the self-deferral of the first CC through the fourth CC, and transmits data through the first CC and the second CC in which back-off is completed.

FIGS. 24 to 26 illustrate further embodiments of the present invention in which a base station determines whether to continue a self-deferral. According to the embodiment of the present invention, the base station may set a reference time point R_s for determining whether to continue the self-deferral. A base station performing the self-deferral may determine whether to continue the self-deferral at the reference time point R_s based on at least one information. The reference time point R_s may be set to a specific time point within the self-referential period.

More specifically, the base station verifies a back-off completion time of the second carrier at the reference time point R_s while performing the self-deferral in the first carrier. The base station determines whether the back-off of the second carrier is completed before the completion time of the self-deferral and the back-off of the first carrier. If the back-off of the second carrier is completed before the completion of the self-deferral and the back-off of the first carrier, the base station continues the self-deferral of the first carrier. The base station may simultaneously transmit data through the first carrier and the second carrier after both the back-off of the first carrier and the back-off of the second carrier are completed. According to an embodiment, the base station may transmit data after performing an additional CCA of the first carrier and the second carrier during the defer period P_d.

However, if the back-off of the second carrier is completed after the completion of the self-deferral and the back-off of the first carrier, the base station cancels the self-deferral of the first carrier. When the self-deferral is canceled, the base station may immediately transmit data through the corresponding carrier after the completion of the back-off of the first carrier. According to an embodiment, the base station may transmit data after performing an additional CCA of the first carrier during the defer period P_d.

FIG. 24 illustrates an embodiment in which the base station determines to continue the self-deferral based on the above method. FIG. 24(a) shows a situation where the back-off counter of each component carrier constituting the multiple carriers is set to be the same, and FIG. 24(b) shows a situation where the back-off counter of each component carrier is set independently. Referring to FIG. 24, interference has occurred in the third CC and the fourth CC while performing the back-off for the first CC through the fourth CC. Therefore, when a general back-off procedure is performed, the back-off of the third CC and the fourth CC may be completed later than the back-off of the first CC and the second CC.

According to the embodiment of the present invention, the base station first performs the self-deferral of the first CC and the second CC. The base station verifies back-off completion times of the third CC and the fourth CC at the reference time point R_s while performing the self-deferral in the first CC and the second CC. The base station may verify each back-off completion time based on the remaining back-off counter values bo_remaining of the third CC and the fourth CC. In the embodiment of FIG. 24, since the back-off of the third CC and the fourth CC is completed before the completion time of the self-deferral and the back-off of the first CC and the second CC, the base stations continue the self-deferral of the first CC and the second CC. According to an embodiment, the base station may also perform the self-deferral in the third CC and/or the fourth CC to synchronize the back-off completion time of the entire component carriers. When the back-off procedures of the first CC through the fourth CC are all completed, the base station may perform an additional CCA for a predetermined defer period P_d according to the embodiment. When the component carriers are idle in the above process, the base station transmits data through the corresponding component carriers.

The reference time point R_s for determining whether to continue the self-deferral may be set according to various embodiments. First, according to an embodiment of the present invention, the self-deferral period may be divided into n intervals (where n is a natural number of 2 or more), and the reference time point R_s may be set to at least one of the ending points of the divided intervals. If the self-deferral period is divided into two intervals as shown in FIG. 24, the reference time point R_s may be set to a half point of the self-deferral period. The reference time point R_s may be independently set for each carrier, but the present invention is not limited thereto, and a common reference time point R_s may be applied to the entire carriers.

According to the embodiment of the present invention, the self-deferral period may be set independently for each carrier. As described above, the base station may adjust the self-deferral period of each carrier within a maximum self-deferral period based on at least one variable. Since the back-off counter and the interference situation may be different for each carrier, the base station may independently perform data transmission through multiple carriers by independently setting the self-deferral period for each carrier.

According to an embodiment of the present invention, the base station may set a carrier set including at least one component carrier on which the base station intends to transmit data and obtain a common back-off counter for the carrier set. In the embodiment of FIG. 24(b), the first CC and the second CC are set to the same carrier set and are assigned a common back-off counter 5. The base station performs back-off of each component carrier of the carrier set using the obtained common back-off counter. That is, the base station may synchronize a multi-carrier transmission by performing back-off with assigning the same back-off counter for each component carrier in the same carrier set.

According to the embodiment of the present invention, the common back-off counter may be set by various methods. According to an embodiment, the base station may set a single contention window value for all the component carriers of the carrier set and use a back-off counter obtained within the single contention window as the common back-off counter. That is, in the embodiment of FIG. 24(b), a single contention window for the first CC and the second CC of the same carrier set may be maintained. According to another embodiment, the base station may set the contention window value independently for each component carrier of the carrier set. That is, separate contention windows for each of the first CC and the second CC of the same carrier set may be maintained in the embodiment of FIG. 24(b). The base station may obtain a back-off counter within the largest contention window value among the contention window values of all the component carriers in the carrier set and use the obtained back-off counter as the common back-off counter. When the contention window value of the first CC is greater than or equal to the contention window value of the second CC, the base station obtains the common back-off counter within the contention window value of the first CC. However, when the contention window value of the second CC is greater than or equal to the contention window value of the first CC, the base station obtains the common back-off counter within the contention window value of the second CC. Each back-off of the first CC and the second CC is performed using the obtained common back-off counter.

The base station simultaneously transmits data through at least one component carrier in which the back-off is completed. According to an embodiment, a multi-carrier data transmission may be performed on a carrier set basis. For example, the above-described self-deferral may be performed to synchronize the back-off completion time between the component carriers of the same carrier set. That is, via the self-deferral, back-off completion times between each component carrier of the first carrier set may be synchronized with each other, and back-off completion times between each component carrier of the second carrier set may be synchronized with each other. When the back-off of the second carrier set is also completed and the second carrier set is idle, at the back-off completion time of the first carrier set, the base station may perform a synchronized transmission using the first carrier set and the second carrier set together. However, when there is no other carrier in which the back-off is already completed and in an idle state, at the back-off completion time of the first carrier set, the base station may perform a synchronized transmission using only the first carrier set. According to an embodiment, the base station may perform a carrier aggregation on a carrier set basis to perform data transmission.

According to a further embodiment of the present invention, the synchronized transmission may be performed using only component carriers of the same carrier set, depending on the configuration of the base station. When all the component carriers of the same carrier set complete the back-off at the same time, the base station may immediately perform data transmission without the self-deferral of the carrier set. Accordingly, the base station may efficiently use the time and frequency resources according to the multi-carrier transmission and reduce the data transmission delay.

According to yet another embodiment of the present invention, the reference time point R_s for determining whether to continue the self-deferral may be set to a time point at which a self-deferral of a carrier in which the back-off is completed first is started. When the back-off of the first carrier is completed first, the self-deferral of the first carrier may be modified by the following ways in accordance with a CCA result of the remaining carrier(s) excluding the corresponding carrier(s) at the reference time point R_s.

First, the carriers in the busy state at the reference time point R_s among the remaining carriers(s) may be excluded from the multi-carrier simultaneous transmission regardless of the remaining back-off counter value of the first carrier. Considering the length of the general wireless LAN or LTE data and the self-deferral length, it is unlikely that the carrier in the busy state will change to the idle state again within the self-deferral period. In this case, the carriers in the busy state do not affect the setting of the self-deferral period of the first carrier.

Second, the carriers in the idle state at the reference time point R_s among the remaining carriers(s) may be used for the multi-carrier simultaneous transmission only when the back-off thereof can be completed within the maximum self-deferral period of the first carrier. That is, a carrier in which the back-off cannot be completed within the maximum self-deferral period of the first carrier since the back-off counter value is greater than a predetermined value may be excluded from the multi-carrier simultaneous transmission even if it is idle at the reference time point R_s. In this case, the base station determines the self-deferral period based on a back-off counter of a carrier having the largest back-off counter value among the remaining carriers to be used for the multi-carrier simultaneous transmission. The base station may include as many carriers as possible in the multi-carrier simultaneous transmission by setting the self-deferral period in consideration of the carrier in which the back-off is completed at the latest among the carriers capable of participating in the simultaneous transmission.

The self-deferral period determined in the above manner may be adjusted based on the channel change of the remaining carriers. A carrier that is changed to be the busy state within the set self-deferral period may be excluded from the multi-carrier simultaneous transmission. If the excluded carrier is a carrier with the largest back-off value, the base station may reduce the self-deferral period of the first carrier. In this case, the self-deferral period may be changed based on a back-off counter of a carrier having the largest back-off counter value next to the excluded carrier among the remaining carriers to be used for the simultaneous transmission.

FIGS. 25 and 26 illustrate embodiments in which the base station determines to cancel the self-deferral based on the above-described method of determining whether to continue the self-deferral. FIG. 25 shows a situation where the back-off counter of each component carrier constituting the multiple carriers is set to be the same, and FIG. 26 shows a situation where the back-off counter of each component carrier is set independently. In the embodiments of FIGS. 25 and 26, duplicative description of parts which are the same as or corresponding to the embodiment of FIG. 24 described above will be omitted.

First, FIG. 25 illustrates an embodiment in which the base station cancels the self-deferral. FIG. 25(a) shows a wasted time t_w in accordance with interference occurred by other carriers within the self-deferral period. FIG. 25(b) shows a situation in which the self-deferral is canceled for preventing the wasted time t_w.

Referring to FIG. 25, interference has occurred in the third CC and the fourth CC while performing the back-off for the first CC through the fourth CC. The base station first performs the self-deferral of the first CC and the second CC. However, as shown in FIG. 25(a), the back-off of the third CC and the fourth CC may not be completed before the completion time of the self-deferral and the back-off of the first CC and the second CC. In this case, time resources may be unnecessarily wasted if the self-deferral is performed in the first CC and the second CC.

Therefore, the base station verifies back-off completion times of the third CC and the fourth CC at the reference time point R_s while performing the self-deferral in the first CC and the second CC. The base station may verify each back-off completion time based on the remaining back-off counter values bo_remaining of the third CC and the fourth CC. Since the back-off of the third CC and the fourth CC is completed after the completion time of the self-deferral and the back-off of the first CC and the second CC, the base stations cancels the self-deferral of the first CC and the second CC as shown in FIG. 25(b). The base station may immediately transmit data through the corresponding component carrier after the completion of the back-off of the first CC and the second CC. According to an embodiment, the base station may transmit data after performing an additional CCA of the first CC and the second CC during the defer period P_d.

Next, FIG. 26 illustrates another embodiment in which the base station cancels the self-deferral. FIG. 26(a) shows a wasted time t_w in accordance with interference occurred in other carriers within the self-deferral period. FIG. 26(b) shows a situation in which the self-deferral is canceled for preventing the wasted time t_w.

In the embodiment of FIG. 26, the back-off counter of each component carrier is set independently. As described above, the base station may set a carrier set including at least one component carrier on which the base station intends to transmit data and obtain a common back-off counter for the carrier set. In the embodiment of FIG. 26, the first CC and the second CC are set to the same carrier set and are assigned a common back-off counter 5. The base station performs back-off of each component carrier of the carrier set using the obtained common back-off counter As described in the embodiment of FIG. 25, interference has occurred in the third CC and the fourth CC while performing the back off for the first CC through the fourth CC. The base station first performs the self-deferral of the first CC and the second CC. However, as shown in FIG. 26(a), the back-off of the third CC and the fourth CC may not be completed before the completion time of the self-deferral and the back-off of the first CC and the second CC.

Therefore, the base station verifies back-off completion times of the third CC and the fourth CC at the reference time point R_s while performing the self-deferral in the first CC and the second CC. Since the back-off of the third CC and the fourth CC is completed after the completion time of the self-deferral and the back-off of the first CC and the second CC, the base stations cancels the self-deferral of the first CC and the second CC as shown in FIG. 26(b).

Hereinafter, an embodiment of an LBT operation in the LAA will be summarized again. During the LBT operation in the LAA, an ECCA slot size is 9 μs, and an actual sensing time in the slot is at least 4 μs. In the case of the LBT category-4 method for the PDSCH, one defer period is constituted by a period of 16 μs and n consecutive CCA slots. Here, n is a positive integer, a CCA slot period is 9 μs, and the number n of slots in the defer period may be set differently according to a QoS class. During the starting 16 μs period of the defer period, the countdown of the back-off counter is not performed. When all the n slots of the back-off counter are observed as idle, the back-off counter may be decreased to one at the end of the defer period. If the back-off counter reaches zero after a decrement, the node may not immediately perform transmission and performs CCA check during at least one slot to continue the ECCA process. If the channel is observed as busy within the defer period, the corresponding defer period may be suspended.

Hereinafter, an LBT process and a multi-carrier LBT will be described. During an ECCA process of the LBT, the back-off counter need not be decreased when the slot is idle. That is, the back-off counter may be selectively decreased when the slot is idle. If a slot is not observed, the slot should be regarded as busy.

The following two methods may be considered for the LBT for multiple carriers. First, the base station may perform a category-4 LBT on only one unlicensed band carrier. That is, when the base station completes the LBT on the one carrier, the base station may sense other carriers for a predetermined interval, such as a PIFS (i.e., 25 μs), before completion of the LBT in the corresponding carrier. The base station may transmit DL data burst through the other carrier(s) that are sensed idle in the above procedure. How fast the base station can change a carrier performing the category-4 based LBT may be determined in units of a subframe, a plurality of subframes, or a radio resource control (RRC) level.

Next, the base station may perform a category-4 based LBT on one or more unlicensed band carriers. In other words, the base station may transmit DL data burst through carriers in which the category-4 based LBT is completed. In this case, the base station may perform the self-deferral to align transmission timings of multiple carriers. If the base station is capable of receiving on one carrier and simultaneously transmitting on another carrier, the base station may freeze a back-off counter for the carrier in which no transmission is performed while the transmission is being performed on another carrier. In this case, the base station may perform the freezing of the back-off counter when the carriers are apart from each other within a preset frequency range.

When a multi-carrier LBT is performed within one carrier set, at least one of the two methods suggested above may be applied. Alternatively, different methods of multi-carrier LBT may be performed for each carrier set.

Figure 27:
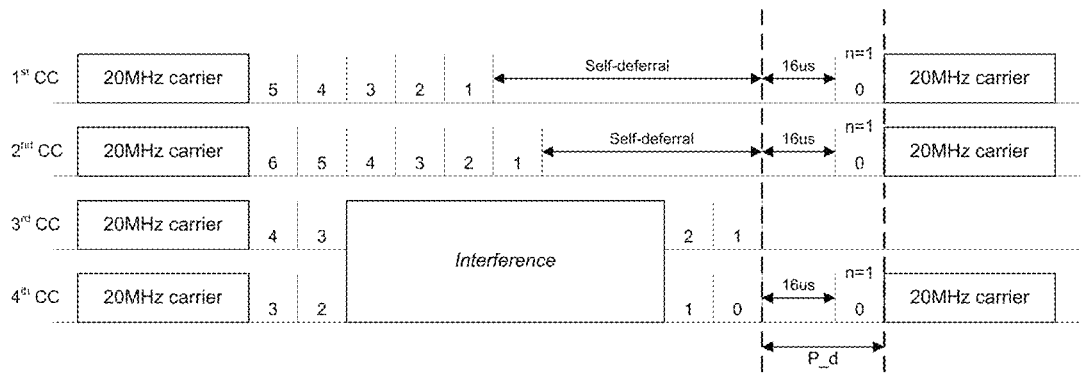
FIG. 27 illustrates a method of performing a self-deferral according to another embodiment of the present invention.

FIG. 27 illustrates a method of performing a self-deferral according to another embodiment of the present invention. In the embodiment of FIG. 27, duplicative description of parts which are the same as or corresponding to the embodiments of the above-described drawings will be omitted.

As described above, the base station may perform the self-deferral to synchronize a multi-carrier data transmission. According to the embodiment of the present invention, the self-deferral may be performed when the remaining back-off counter value of the corresponding carrier is greater than zero. In the embodiment of FIG. 27, the base station performs the self-deferral when the remaining back-off counter value of the first CC and the second CC is one. In a carrier that is in a busy state during the back-off, the base station operates according to the existing CCA rule. The base station may apply a CCA for the predetermined defer period P_d in the LBT process.

More specifically, as shown in FIG. 27, the base station may perform the self-deferral in the first CC and the second CC when the remaining back-off counter values of the corresponding carriers are one. When the self-deferral is terminated and the corresponding carrier maintains an idle state for the predetermined defer period P_d thus the back-off counter expires, the base station may transmit data through the carrier. The defer period P_d is constituted by an interval of 16 μs in which the back-off counter is not decreased, and the n additional subsequent CCA slots. The CCA slot interval may be set to 9 μs, same as Wi-Fi, or a similar length therewith, and the number n of slots may be set differently according to a QoS class.

According to the embodiment, the base station may decrease the back-off counter in the n additional CCA slots. The base station performs data transmission simultaneously through a plurality of carriers in which the back-off counter value reaches zero. In the embodiment of FIG. 27, the self-deferral is performed when the remaining back-off counter value is 1, but the present invention is not limited thereto. That is, the base station may perform the self-deferral even if an arbitrary back-off counter value remains. According to an embodiment, a fast data transmission is possible when the data is transmitted immediately after the back-off counter is decreased through the defer period P_d. Accordingly, the base station may set a maximum and/or minimum back-off counter as a condition for performing the self-deferral, and may perform the self-deferral when the remaining back-off counter is within the set back-off counter range. If the back-off counters are different for each carrier at the time when the self-deferral is performed, the defer period P_d may start at a different time point for each carrier.

Figure 28:
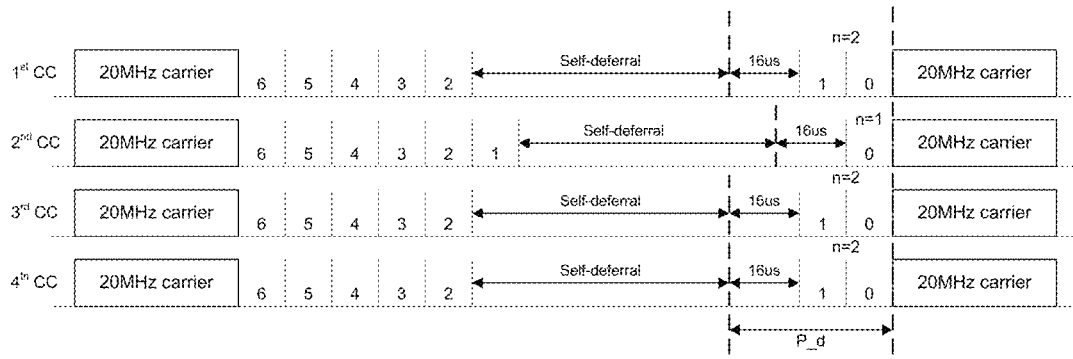
FIG. 28 illustrates a method of performing a self-deferral according to yet another embodiment of the present invention.

FIG. 28 illustrates a method of performing a self-deferral according to yet another embodiment of the present invention. In the embodiment of FIG. 28, duplicative description of parts which are the same as or corresponding to the embodiments of the above-described drawings will be omitted.

According to the embodiment of FIG. 28, the defer period P_d may be set differently for each carrier. For example, due to the transmission of different QoS data, the slot number n of the defer period P_d may be determined differently for each carrier. Therefore, when the back-off counter can be decreased in the slot of the defer period P_d, the base station may determine the start time of the defer period P_d based on the length of the corresponding defer period P_d. Therefore, in the embodiment of FIG. 28, defer periods P_d of the first CC, the second CC and the fourth CC, in which the number of slots is 2, may be started when the remaining back-off counter value of the corresponding carrier is 2. Similarly, defer period P_d of the third CC, in which the number of slots is 1, may be started when the remaining back-off counter value of the corresponding carrier is 1.

The base station may set a maximum and/or minimum back-off counter as a condition for starting the defer period P_d, and may start the defer period P_d at the same time point for each carrier within the set back-off counter range. On the other hand, the remaining back-off counter value for starting the self-deferral may be set identically for each carrier, but may be set differently from each other for transmission synchronization.

Hereinafter, a method of setting an adaptive energy detection threshold according to region-specific regulations when performing energy detection for channel access in the LAA Scell will be described. In the LAA Scell, the maximum allowable energy detection threshold may be selected from two values in the {X, Y} set (where Y<X). Herein, two methods of setting X, Y as the maximum allowable energy detection threshold, i.e., Equation 1 or Equation 2, may be considered.

$$X = A + (23 - Ph) + 10 \log W \quad \text{[Equation 1]}$$

$$X = A \text{ for } Ph <= 23$$

$$X = A + (23 - Ph) \text{ otherwise} \quad \text{[Equation 2]}$$

Herein, A is −75 dBm/MHz and W is a bandwidth (in MHz) to which the energy detection process is applied. Ph is a transmission power value of data and may be determined according to the following two options. As a first option, Ph may be the maximum transmission power class of a LAA transmission point within the unlicensed band. As a second option, Ph may be the maximum transmission power within a transmission burst following the LBT process.

In addition, the following Equation 3 may be considered as a threshold for the maximum allowable energy detection.

$$X_{Thres\_max} = \max\left\{\begin{array}{l} -72 + 10 \cdot \log10(BWMHz/20 \text{ MHz})dBm, \\ \min\left\{\begin{array}{l} T_{max}, \\ T_{max} - T_A + (P_H + 10 \cdot \\ \log10(BWMHz/20 \text{ MHz}) - P_{TX}) \end{array}\right\} \end{array}\right\} \quad \text{[Equation 3]}$$

Herein, TA is set to be 10 dB for transmissions that include a PDSCH and set to be 5 dB for transmissions that include discovery signal transmission without including a PDSCH. Also, PH is set to be 23 dBm and Tmax value is set to be −75 dB/MHz+10*log 10(BW MHz). When Tmax is converted in units of dBm, it is set as shown in Equation 4 below.

$$T_{max} \text{ (dBm)} = 10 \cdot \log 10(3.16228 \cdot 10^{-8} \text{ (mW/MHz)} \cdot BWMHz \text{ (MHz)}) \quad \text{[Equation 4]}$$

Also, PTX denotes a dB value as a maximum output power value that can be set for each carrier. Herein, the base station may use PTX as a fixed value irrespective of a single carrier transmission or a multi-carrier transmission. According to another embodiment, the base station may distribute and apply the maximum transmission power value in each carrier such that the sum of the maximum power in each transmittable carrier is PTX in case of a multi-carrier transmission. In addition, BW MHz denotes a bandwidth in units of MHz in a single carrier.

Figure 29:
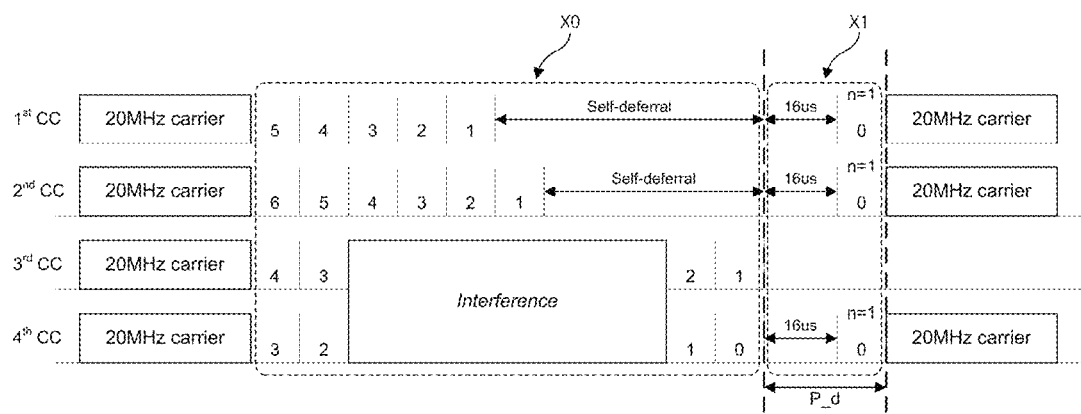
FIGS. 29 and 30 illustrate embodiments of the present invention for setting an energy detection threshold in performing an LBT for a multi-carrier transmission.
Figure 30:
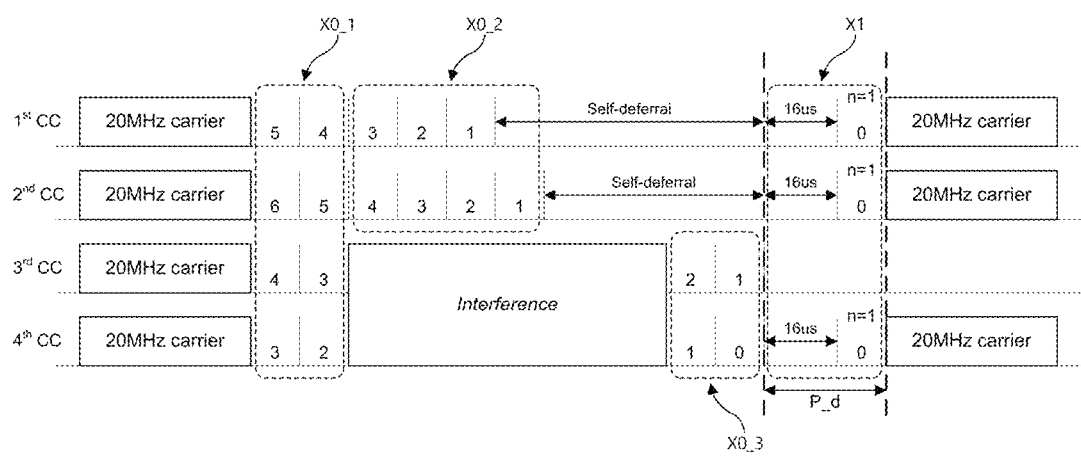

FIGS. 29 and 30 illustrate embodiments of the present invention for setting an energy detection threshold in performing an LBT for a multi-carrier transmission. The base station and the user equipment may determine whether a carrier is busy based on an energy detection threshold (i.e., an energy detection reference value) when performing the CCA. That is, when a radio signal is not detected in the carrier or a signal having a level lower than the energy detection threshold is detected, the carrier is determined to be idle. However, when a signal having a level exceeding the energy detection threshold is detected in the carrier, the carrier is determined to be busy.

According to the embodiment of the present invention, the energy detection threshold may be determined based on at least one of a total transmission power and a total bandwidth of data to be simultaneously transmitted by the base station. When the transmission power is set low, the base station may apply a relatively high energy detection threshold to attempt occupying a channel more actively. In addition, when data is transmitted through a wide bandwidth, the determined total transmission power is distributed, thereby the power interference in a unit band being lowered. Therefore, the base station may increase the energy detection threshold as the data is transmitted through a wide bandwidth.

FIG. 29 illustrates a method of setting the energy detection threshold according to an embodiment of the present invention. According to the embodiment of the present invention, the base station may determine the energy detection threshold based on at least one of a total transmission power and a total bandwidth of data to be simultaneously transmitted. However, which component carriers are to be used for actual data transmission may be determined when the back-off process is completed.

Therefore, according to the embodiment of the present invention, the base station may determine an energy detection threshold X0 in an LBT operation (hereinafter, referred to as the first LBT operation) in a situation where the transmission power and the total bandwidth of data are not determined yet and an energy detection threshold X1 in an LBT operation (hereinafter, referred to as the second LBT operation) in a situation where the above parameters are determined in different ways. The first LBT operation may indicate a CCA in a back-off and a self-deferral period, and the second LBT operation may indicate a CCA in a predetermined at least one slot immediately before transmission of data.

According to the embodiment, the energy detection threshold X0 in the first LBT operation may be independently determined for each carrier. When the energy detection threshold is determined based on Equation 1 above, the Ph may be set to be a fixed power value and the W may be set to be a bandwidth of a carrier in which the energy detection is performed. For example, when Ph=23 dBm and W=20 MHz, the energy detection threshold X0 may be determined to be −62 dBm. According to an embodiment, Ph may be set considering the maximum transmission power class value. Also, when the energy detection threshold is determined based on Equation 3 above, PH may set to be a fixed power value, and the BW MHz may be set to be a bandwidth of a carrier in which the energy detection is performed. For example, when PH=23 dBm and BW MHz=20 MHz, the energy detection threshold X0 may be determined to be −72 dBm. According to an embodiment, PH may be set considering the maximum transmission power class value.

According to another embodiment, the energy detection threshold X0 in the first LBT operation may be determined in consideration of a total bandwidth in which the LBT operation is performed and a transmission power. For example, Ph may be set by distributing a transmittable power value to the total bandwidth in which the energy detection is performed. That is, in the first LBT operation, Ph='the total transmission power'*'the bandwidth of carrier in which the energy detection is performed'/'the total bandwidth in which the energy detection is performed'. For example, when the transmittable power value is 23 dBm, the bandwidth of the carrier in which energy detection is performed is 20 MHz, and the total bandwidth in which the energy detection is performed is 80 MHz, then Ph=23*20/80 dBm. Therefore, the energy detection threshold X0 is set to be higher as the transmittable power value with respect to the total bandwidth in which the energy detection is performed is the lower. According to a further embodiment of the present invention, the Ph value may be set differently for each carrier.

On the other hand, the energy detection threshold X1 in the second LBT operation may be determined in consideration of a total transmission power and a total bandwidth of data to be actually transmitted. As described above, the second LBT operation indicates an LBT operation in a situation where the transmission power and the total bandwidth of data are determined, and indicates a CCA in a predetermined at least one slot immediately before transmission of data. According to an embodiment, the second LBT operation may indicate a CCA in the defer period P_d, but the present invention is not limited thereto. In the second LBT operation, Ph='the total transmission power'*'the bandwidth of carrier in which the energy detection is performed'/'the total bandwidth of data to be simultaneously transmitted'. For example, in the embodiment of FIG. 29, as a result of performing the LBT, data is simultaneously transmitted through a 60 MHz band including the first CC, the second CC, and the fourth CC. Therefore, the total transmission power value is 23 dBm, the bandwidth of the carrier in which the energy detection is performed is 20 MHz, the total bandwidth of data to be simultaneously transmitted is 60 MHz, and Ph=23*20/60 dBm. Accordingly, the energy detection threshold X1 is set to be higher as the total transmission power value with respect to the bandwidth on which the data is simultaneously transmitted is lower.

In the above-described embodiments, the bandwidth of the carrier in which the energy detection is performed is 20 MHz, but the present invention is not limited thereto. That is, a bandwidth of a carrier in which the energy detection is performed may be set to a specific value of 20 MHz or less, such as 10 MHz, 5 MHz, or the like.

FIG. 30 illustrates a method of setting an energy detection threshold according to another embodiment of the present invention. In the embodiment of FIG. 30, duplicative description of parts which are the same as or corresponding to the embodiment of FIG. 29 will be omitted.

According to another embodiment of the present invention, the base station may set the energy detection threshold differently based on whether or not each carrier is busy in the LBT process. In a back-off procedure, the energy detection may be performed based on different bandwidths depending on whether or not each carrier is busy. In this case, when the transmission power is distributed to the idle bandwidth, the transmission power value for each carrier becomes different. Therefore, in the equation of the embodiment of FIG. 29 for setting the energy detection threshold, 'the total bandwidth in which the energy detection is performed' may be modified to 'the total bandwidth of the idle state in which the energy detection is performed'. Specifically, in the embodiment of FIG. 30, in a period in which an 80 MHz band including the first CC through the fourth CC is idle, the energy detection threshold X0_1 may be calculated by setting the total bandwidth value to 80 MHz. However, in a period in which the third CC and the fourth CC are busy and a 40 MHz band including the first CC and the second CC is idle, the energy detection threshold X0_2 may be calculated by setting the total bandwidth value to 40 MHz.

On the other hand, when simultaneous data transmission using multiple carriers is performed through a self-deferral, etc., it can be determined that a transmission using a specific carrier is unavailable when considering the remaining back-off counter of the corresponding carrier. In this case, the base station may determine the energy detection threshold by setting the total bandwidth and/or the total transmission power value of the above equation in consideration of the number of carriers capable of simultaneous transmission. For example, in the embodiment of FIG. 30, it can be determined that the back-off of the third CC is not completed at the time of multi-carrier simultaneous transmission. In this case, the base station may Calculate the energy detection threshold X0_3 of the fourth CC by setting the total bandwidth value to 60 MHz.

According to another embodiment of the present invention, when a carrier in which a separate CCA such as a self-deferral is not performed is present, the energy detection threshold may be determined considering only carriers in which the energy detection is actually performed excluding the corresponding carrier. That is, in the embodiment of FIG. 30, the base station may calculate the energy detection threshold X0_3 of the fourth CC by setting the total bandwidth to 20 MHz excluding the first CC and the second CC in which the self-deferral is performed, and the third CC determined to be unavailable.

Figure 31:
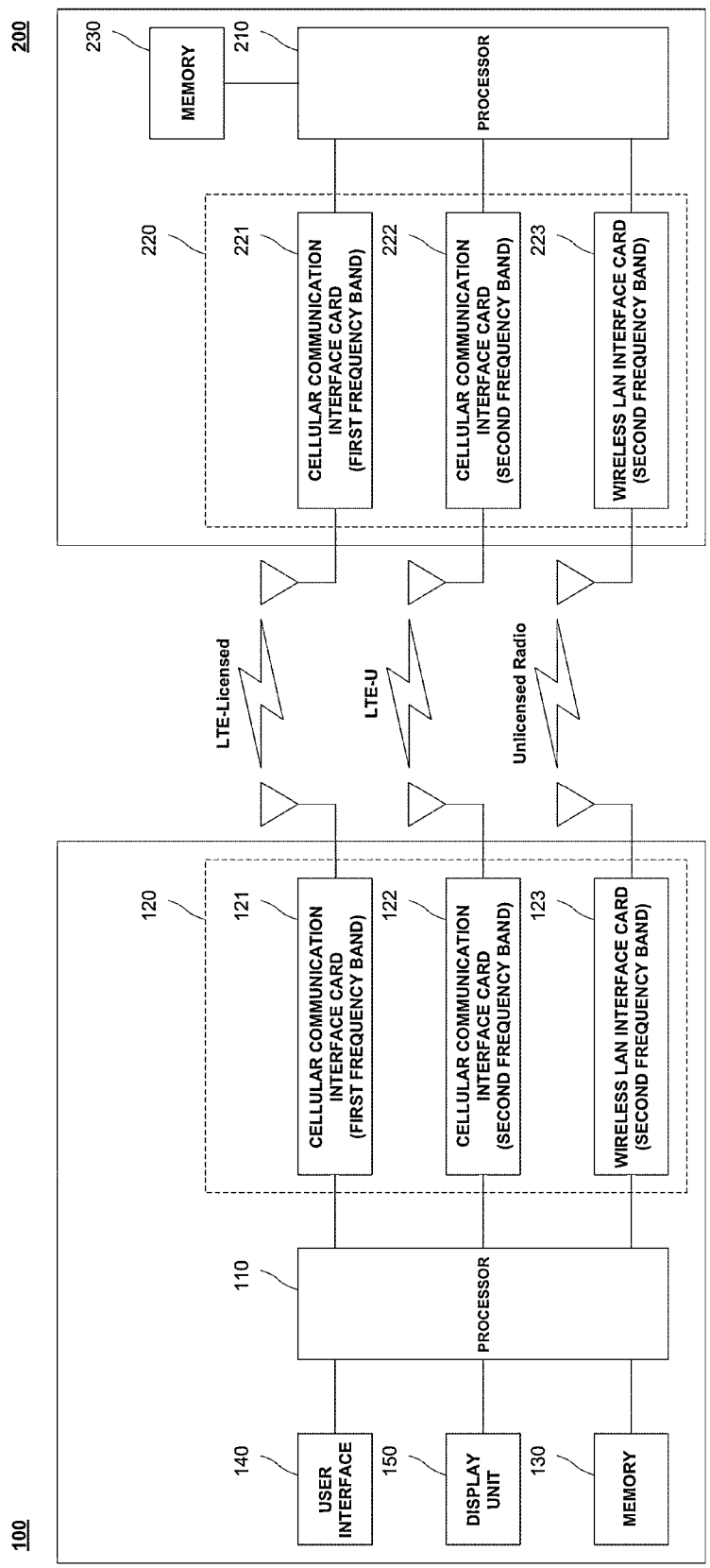
FIG. 31 illustrates configurations of a user equipment and a base station according to an embodiment of the present invention.

FIG. 31 illustrates configurations of a user equipment and a base station according to an embodiment of the present invention. In the present invention, the user equipment may be implemented by various types of wireless communication devices or computing devices of which portability and mobility are guaranteed. The user equipment (UE) may be referred to as a terminal, a station (STA), a mobile subscriber (MS), and the like. In the present invention, the base station may control and take charge of cells (e.g., a macro cell, a femto cell, a pico cell, and the like) corresponding to service areas and perform functions including signal transmission, channel designation, channel monitoring, self diagnosis, relay, and the like. The base station may be referred to as an evolved NodeB (eNB), an access point (AP), and the like.

Referring to FIG. 31, the user equipment 100 may include a processor 110, a communication module 120, a memory 130, a user interface unit 140, and a display unit 150.

The processor 110 may execute various commands or programs according to the present invention and process data in the user equipment 100. Further, the processor 100 may control all operations of the respective units of the user equipment 100 and control data transmission/reception among the units. For example, the processor 110 may receive/process a downlink signal according to the proposal of the present invention.

The communication module 120 may be an integrated module that performs mobile communication using a mobile communication network and wireless LAN access using a wireless LAN. To this end, the communication module 120 may include a plurality of network interface cards such as cellular communication interface cards 121 and 122 and a wireless LAN interface card 123 in an internal or external type. In FIG. 31, the communication module 120 is illustrated as the integrated module, but the respective network interface cards may be independently disposed according to a circuit configuration or a purpose unlike FIG. 31.

The cellular communication interface card 121 transmits/receives a radio signal to/from at least one of a base station 200, an external device, and a server by using the mobile communication network and provides a cellular communication service at a first frequency band based on a command of the processor 110. The cellular communication interface card 121 may include at least one NIC module using an LTE-licensed frequency band. The cellular communication interface card 122 transmits/receives the radio signal to/from at least one of the base station 200, the external device, and the server by using the mobile communication network and provides the cellular communication service at a second frequency band based on the command of the processor 110. The cellular communication interface card 122 may include at least one NIC module using an LTE-unlicensed frequency band. For example, the LTE-unlicensed frequency band may be a band of 2.4 GHz or 5 GHz.

The wireless LAN interface card 123 transmits/receives the radio signal to/from at least one of the base station 200, the external device, and the server through wireless LAN access and provides a wireless LAN service at the second frequency band based on the command of the processor 110. The wireless LAN interface card 123 may include at least one NIC module using a wireless LAN frequency band. For example, the wireless LAN frequency band may be an unlicensed radio band such as the band of 2.4 GHz or 5 GHz.

The memory 130 stores a control program used in the user equipment 100 and various resulting data. The control program may include a program required for the user equipment 100 to perform wireless communication with at least one of the base station 200, the external device, and the server. The user interface 140 includes various types of input/output means provided in the user equipment 100. The display unit 150 outputs various images on a display screen.

Further, the base station 200 according to the exemplary embodiment of the present invention may include a processor 210, a communication module 220, and a memory 230.

The processor 210 may execute various commands or programs according to the present invention and process data in the base station 200. Further, the processor 210 may control all operations of the respective units of the base station 200 and control data transmission/reception among the units. For example, the processor 210 may transmit/process a downlink signal according to the proposal of the present invention. For example, it may perform simultaneous data transmission using multiple carriers according to the embodiments of FIGS. 17 to 30.

The communication module 220 may be an integrated module that performs the mobile communication using the mobile communication network and the wireless LAN access using the wireless LAN like the communication module 120 of the user equipment 100. To this end, the communication module 120 may include a plurality of network interface cards such as cellular communication interface cards 221 and 222 and a wireless LAN interface card 223 in the internal or external type. In FIG. 31, the communication module 220 is illustrated as the integrated module, but the respective network interface cards may be independently disposed according to the circuit configuration or the purpose unlike FIG. 31.

The cellular communication interface card 221 transmits/receives the radio signal to/from at least one of the user equipment 100, the external device, and the server by using the mobile communication network and provides the cellular communication service at the first frequency band based on a command of the processor 210. The cellular communication interface card 221 may include at least one NIC module using the LTE-licensed frequency band. The cellular communication interface card 222 transmits/receives the radio signal to/from at least one of the user equipment 100, the external device, and the server by using the mobile communication network and provides the cellular communication service at the second frequency band based on the command of the processor 210. The cellular communication interface card 222 may include at least one NIC module using the LTE-unlicensed frequency band. The LTE-unlicensed frequency band may be the band of 2.4 GHz or 5 GHz.

The wireless LAN interface card 223 transmits/receives the radio signal to/from at least one of the user equipment 100, the external device, and the server through the wireless LAN access and provides the wireless LAN service at the second frequency band based on the command of the processor 210. The wireless LAN interface card 223 may include at least one NIC module using the wireless LAN frequency band. For example, the wireless LAN frequency band may be the unlicensed radio band such as the band of 2.4 GHz or 5 GHz.

In FIG. 31, blocks of the user equipment and the base station logically divide and illustrate elements of the device. The elements of the device may be mounted as one chip or a plurality of chips according to design of the device. Further, some components of the user equipment 100, that is to say, the user interface 140 and the display unit 150 may be selectively provided in the user equipment 100. Further, some components of the base station 200, that is to say, the wireless LAN interface 223, and the like may be selectively provided in the base station 200. The user interface 140 and the display unit 150 may be additionally provided in the base station 200 as necessary.

The method and the system of the present invention are described in association with the specific embodiments, but some or all of the components and operations of the present invention may be implemented by using a computer system having a universal hardware architecture.

The description of the present invention is used for illustration and those skilled in the art will understand that the present invention can be easily modified to other detailed forms without changing the technical spirit or an essential feature thereof. Therefore, it is to be understood that the aforementioned exemplary embodiments are illustrative in all aspects and not restrictive. For example, each component described as a single type may be implemented to be distributed and similarly, components described to be distributed may also be implemented in a combined form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

The present invention is usable in various communication devices (e.g., a station or access point using unlicensed band communication, a station or a base station using cellular communication, or the like) used in a wireless communication system.

The invention claimed is:
1. A wireless communication apparatus, comprising:
a communication module; and
a processor,
wherein the processor is configured to:
obtain a common back-off counter for a carrier set on which data is to be transmitted,
wherein the common back-off counter is obtained based on a largest contention window value among contention window values of component carriers included in the carrier set,
wherein the contention window values of each of the component carriers is independently configured,
perform back-off for each of the component carriers using the common back-off counter,
perform a CCA (Clear Channel Assessment) for a first component carrier in which the back-off is completed during a predetermined defer period, and
transmit the data on the first component carrier, when the first component carrier is idle during the defer period.
2. The apparatus of claim 1, wherein the CCA is performed, when any data is not transmitted on the first component carrier after the back-off is completed.
3. The apparatus of claim 1, wherein the processor is further configured to perform a self-deferral not decreasing a back-off counter arbitrarily while performing back-off for a specific component carrier among the carrier set.

4. The apparatus of claim 3, wherein the self-deferral is performed when a remaining back-off counter value of the specific component carrier is greater than zero.
5. The apparatus of claim 1, wherein the defer period is composed of at least one slot.
6. The apparatus of claim 1, wherein an energy detection threshold for the back-off is determined based on at least one of a total bandwidth and a total transmission power of data to be transmitted.
7. The apparatus of claim 6, the energy detection threshold value is set to be higher as the total transmission power value with respect to the total bandwidth is lower.
8. A data communication method using multiple carriers, the method comprising:
obtaining a common back-off counter for a carrier set on which data is to be transmitted,
wherein the common back-off counter is obtained based on a largest contention window value among contention window values of component carriers included in the carrier set,
wherein the contention window values of each of the component carriers is independently configured;
performing back-off for each of the component carriers using the common back-off counter;
performing a CCA (Clear Channel Assessment) for a first component carrier in which the back-off is completed during a predetermined defer period; and
transmitting the data on the first component carrier, when the first component carrier is idle during the defer period.
9. The method of claim 8, wherein the CCA is performed, when any data is not transmitted on the first component carrier after the back-off is completed.
10. The method of claim 9, wherein the self-deferral is performed when a remaining back-off counter value of the specific component carrier is greater than zero.
11. The method of claim 8, wherein the method further comprising:
performing a self-deferral not decreasing a back-off counter arbitrarily while performing back-off for a specific component carrier among the carrier set.
12. The method of claim 8, wherein the defer period is composed of at least one slot.
13. The method of claim 8, wherein an energy detection threshold for the back-off is determined based on at least one of a total bandwidth and a total transmission power of data to be transmitted.
14. The method of claim 13, the energy detection threshold value is set to be higher as the total transmission power value with respect to the total bandwidth is lower.
15. A wireless communication apparatus, comprising:
a communication module; and
a processor,
wherein the processor is configured to:
receive, from a base station, data,
transmit, to the base station, a HARQ-ACK related to the data,
wherein the data is transmitted on a first component carrier in a carrier set,
wherein the first component carrier is a component carrier in which back-off using a common back-off counter is completed,
wherein the data is transmitted when the first component carrier is idle during a predetermined defer period by performing a CCA (Clear Channel Assessment) on the first component carrier during the defer period, wherein the common back-off counter is obtained based on a largest contention window value among contention window values of component carriers included in the carrier set, wherein the contention window values of each of the component carriers is independently configured.

16. The apparatus of claim 15, wherein the defer period is composed of at least one slot.

17. A data communication method using multiple carriers by a user equipment in a wireless communication system, the method comprising:

receiving, from a base station, data; and transmitting, to the base station, a HARQ-ACK related to the data, wherein the data is transmitted on a first component carrier in a carrier set, wherein the first component carrier is a component carrier in which back-off using a common back-off counter is completed, wherein the data is transmitted when the first component carrier is idle during a predetermined defer period by performing a CCA (Clear Channel Assessment) on the first component carrier during the defer period, wherein the common back-off counter is obtained based on a largest contention window value among contention window values of component carriers included in the carrier set, and wherein the contention window values of each of the component carriers is independently configured.

18. The method of claim 17, wherein the defer period is composed of at least one slot.

* * * * *